US012724559B2

(12) United States Patent
Nagata et al.

(10) Patent No.: US 12,724,559 B2
(45) Date of Patent: Sep. 1, 2026

(54) MEMORY SYSTEM CAPABLE OF CONVERTING DATA

(71) Applicant: Kioxia Corporation, Tokyo (JP)

(72) Inventors: Yamato Nagata, Yokohama Kanagawa (JP); Hajime Yamazaki, Kawasaki Kanagawa (JP); Makoto Domon, Sagamihara Kanagawa (JP)

(73) Assignee: Kioxia Corporation, Tokyo (JP)

(*) Notice: Subject to any disclaimer, the term of this patent is extended or adjusted under 35 U.S.C. 154(b) by 54 days.

(21) Appl. No.: 18/820,137

(22) Filed: Aug. 29, 2024

(65) Prior Publication Data

US 2025/0298534 A1 Sep. 25, 2025

(30) Foreign Application Priority Data

Mar. 21, 2024 (JP) ................................ 2024-045361

(51) Int. Cl.
*G06F 3/06* (2006.01)

(52) U.S. Cl.
CPC .......... *G06F 3/0652* (2013.01); *G06F 3/0607* (2013.01); *G06F 3/064* (2013.01); *G06F 3/0679* (2013.01)

(58) Field of Classification Search
None
See application file for complete search history.

(56) References Cited

U.S. PATENT DOCUMENTS 7,610,437 B2 * 10/2009 Sinclair ................. G06F 3/0652 711/104
7,984,084 B2 * 7/2011 Sinclair ............... G06F 16/1847 707/818
8,285,918 B2 * 10/2012 Maheshwari ........ G11C 7/1072 711/159
8,443,263 B2 * 5/2013 Selinger .............. G06F 11/1068 714/768
8,873,284 B2 * 10/2014 Sinclair ............... G06F 12/0246 365/185.11

(Continued)

FOREIGN PATENT DOCUMENTS

JP 6499065 B2 4/2019
JP 2021-189912 A 12/2021

OTHER PUBLICATIONS

Fan et al., "I/O-Cache: A Non-Volatile Memory Based Buffer Cache Policy to Improve Storage Performance", IEEE, 2015, pp. 102-111, https://ieeexplore.ieee.org/stamp/stamp.jsp?tp=&arnumber=7330179&tag=1 (Year: 2015).*

*Primary Examiner* — Christopher D Birkhimer
(74) *Attorney, Agent, or Firm* — Kim & Stewart LLP

(57) ABSTRACT

A memory system is connectable to a host. A memory system includes a non-volatile memory and a controller. The non-volatile memory includes a plurality of blocks, each of which is a unit of an erase operation. The controller is electrically connected to the non-volatile memory and controls the non-volatile memory. The controller receives first data from the host. The controller generates third data from the first data by randomizing the first data using second data that has a different value each time the data erase operation is executed on a first block among the plurality of blocks. The controller writes the second data to the non-volatile memory and the third data to the first block.

20 Claims, 25 Drawing Sheets

(56) References Cited

U.S. PATENT DOCUMENTS 8,995,665 B1 * 3/2015 Tsaur .................... H04L 9/0825 380/277
9,223,693 B2 * 12/2015 Sinclair ............... G06F 12/0246
9,336,133 B2 * 5/2016 Sinclair ............... G06F 12/0246
9,348,746 B2 * 5/2016 Sinclair ............... G06F 12/0246
9,465,731 B2 * 10/2016 Sinclair ............... G06F 12/0246
9,652,382 B1 * 5/2017 Subramanian ...... G06F 12/0253
9,734,050 B2 * 8/2017 Sinclair ............... G06F 12/0253
9,734,911 B2 * 8/2017 Sinclair ................. G06F 3/0658
9,778,855 B2 * 10/2017 Sinclair ................... G06F 3/064
10,108,543 B1 * 10/2018 Duggal ................... G06F 11/14
10,108,544 B1 * 10/2018 Duggal ................... G06F 11/14
10,120,613 B2 * 11/2018 Sinclair ................... G06F 12/02
10,133,490 B2 * 11/2018 Sinclair ................. G06F 3/0655
10,255,179 B2 * 4/2019 Ji .......................... G06F 3/0659
10,430,279 B1 * 10/2019 Dittia .................... G06F 3/0656
10,460,110 B1 * 10/2019 Allo .......................... H04L 9/14
10,739,996 B1 * 8/2020 Ebsen ................. G06F 16/1727
10,795,812 B1 * 10/2020 Duggal ................... G06F 3/067
10,983,715 B2 * 4/2021 Sharoni ................... G06F 21/79
11,086,537 B2 * 8/2021 Byun .................. G06F 12/0253
11,748,271 B2 * 9/2023 Dodds ................... G06F 12/145 713/193
11,989,138 B2 * 5/2024 Grosz ..................... G06F 21/78
2004/0034785 A1 2/2004 Tai
2007/0033325 A1 * 2/2007 Sinclair ................. G06F 3/0608 711/170
2008/0082596 A1 * 4/2008 Gorobets ............ G06F 12/0253
2008/0189477 A1 * 8/2008 Asano ................. G06F 12/0246 711/E12.008
2011/0145473 A1 * 6/2011 Maheshwari ........ G11C 7/1072 711/E12.008
2011/0157992 A1 * 6/2011 Strasser .............. G06F 12/0246 365/185.18
2011/0161784 A1 * 6/2011 Selinger .............. G06F 11/1016 714/E11.002
2014/0325148 A1 * 10/2014 Choi ..................... G06F 3/0659 711/114
2014/0365719 A1 * 12/2014 Kuzmin .............. G06F 12/0246 711/103
2015/0227602 A1 * 8/2015 Ramu ................. G06F 11/1456 707/634
2016/0246713 A1 * 8/2016 Choi ..................... G06F 3/0608
2017/0123655 A1 * 5/2017 Sinclair ................... G06F 3/061
2017/0160939 A1 6/2017 Atsumi
2017/0242790 A1 * 8/2017 O'Krafka .............. G06F 3/0652
2018/0189175 A1 * 7/2018 Ji .......................... G06F 3/0679
2019/0096485 A1 * 3/2019 Jung ...................... G11C 16/10
2020/0028678 A1 * 1/2020 Gao ...................... G06F 21/602
2020/0089420 A1 * 3/2020 Sharoni ................... G06F 21/79
2020/0192794 A1 * 6/2020 Lee ....................... G06F 3/0653
2020/0201785 A1 * 6/2020 Hanna ................. G06F 11/1004
2020/0218653 A1 * 7/2020 Ryu .................... G06F 12/0253
2020/0264800 A1 * 8/2020 Wysocki ................. G06F 3/064
2020/0310686 A1 * 10/2020 Truong ................... G06F 3/061
2020/0410102 A1 12/2020 Miller
2021/0157720 A1 * 5/2021 Bert ...................... G06F 3/0608
2021/0342362 A1 * 11/2021 Haravu ............... G06F 11/1464
2021/0373784 A1 12/2021 Atsumi
2021/0389904 A1 * 12/2021 Lee ....................... G06F 3/0679
2021/0406216 A1 * 12/2021 Komatsu ................ G06F 16/11
2022/0107797 A1 4/2022 Kim
2022/0278821 A1 * 9/2022 Resch ................... G06F 3/0647
2023/0214136 A1 * 7/2023 Takano ................ G11C 7/1006 711/154
2023/0368194 A1 * 11/2023 Wang ................... G06Q 20/401
2023/0393779 A1 * 12/2023 Kane ..................... G06F 3/0604
2024/0202114 A1 * 6/2024 Tang ................... G06F 12/0246

* cited by examiner

1
NAND FLASH MEMORY
100
SEQUENCER
170
COMMAND REGISTER
160
ADDRESS REGISTER
150
BA
PA
SENSE AMPLIFIER MODULE
140
MEMORY CELL ARRAY
BLK0
BLK1
BLK2
BLK3
110
ROW DECODER
120
DRIVER
130
CMD
ADD
DAT
CEn
CLE
ALE
WEn
REn
RBn
DQ
8
MEMORY CONTROLLER
200
BLOCK CONTROL UNIT
262
SEED VALUE SETTING UNIT
264
DATA MANAGEMENT UNIT
266
RAM
220
ROM
230
CPU
260
ECC
270
R/D
280
HOST I/F
210
BUFFER MEMORY
240
NAND I/F
250
HOST
300

FIG. 5

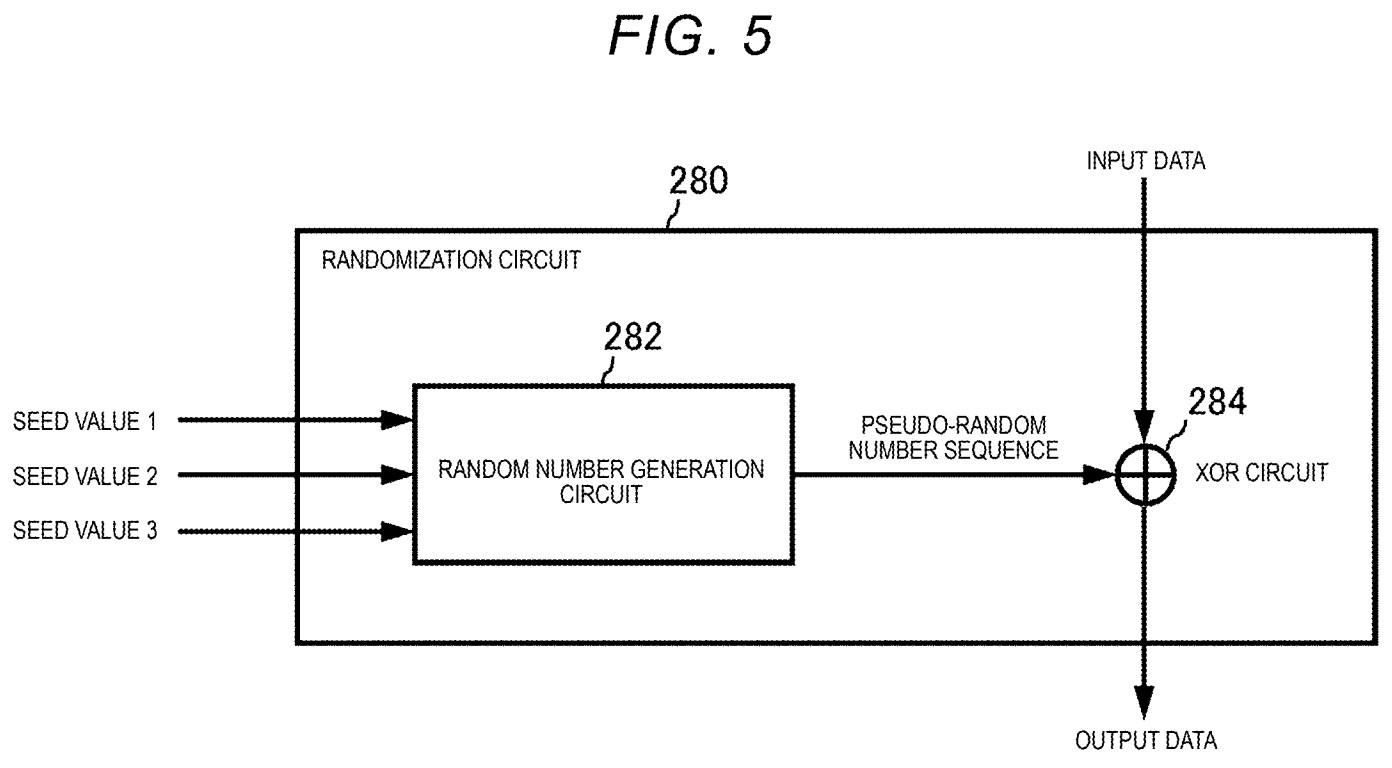

280
RANDOMIZATION CIRCUIT
282
RANDOM NUMBER GENERATION CIRCUIT
SEED VALUE 1
SEED VALUE 2
SEED VALUE 3
PSEUDO-RANDOM NUMBER SEQUENCE
INPUT DATA
284
XOR CIRCUIT
OUTPUT DATA

UPDATE FIRMWARE
UPDATE FIRMWARE UFW
DATA DIVISION / PADDING
DIVIDED UPDATE FIRMWARE (FRAME DATA)
FD1
(1, 1)
FD2
(1, 2)
FD3
(1, 3)
FD4
(1, 4)
FD5
(2, 1)
FD6
(2, 2)
FD7
(2, 3)
FD8
(2, 4)
RANDOMIZATION PROCESS
RANDOMIZED FRAME DATA
ranFD1
(1, 1)
ranFD2
(1, 2)
ranFD3
(1, 3)
ranFD4
(1, 4)
ranFD5
(2, 1)
ranFD6
(2, 2)
ranFD7
(2, 3)
ranFD8
(2, 4)
DATA COMBINING
DATA COMBINING
PAGE DATA
ranFD1
ranFD2
ranFD3
ranFD4
ranFD5
ranFD6
ranFD7
ranFD8
PD1
PD2
WRITE TO NAND FLASH MEMORY

FIG. 7

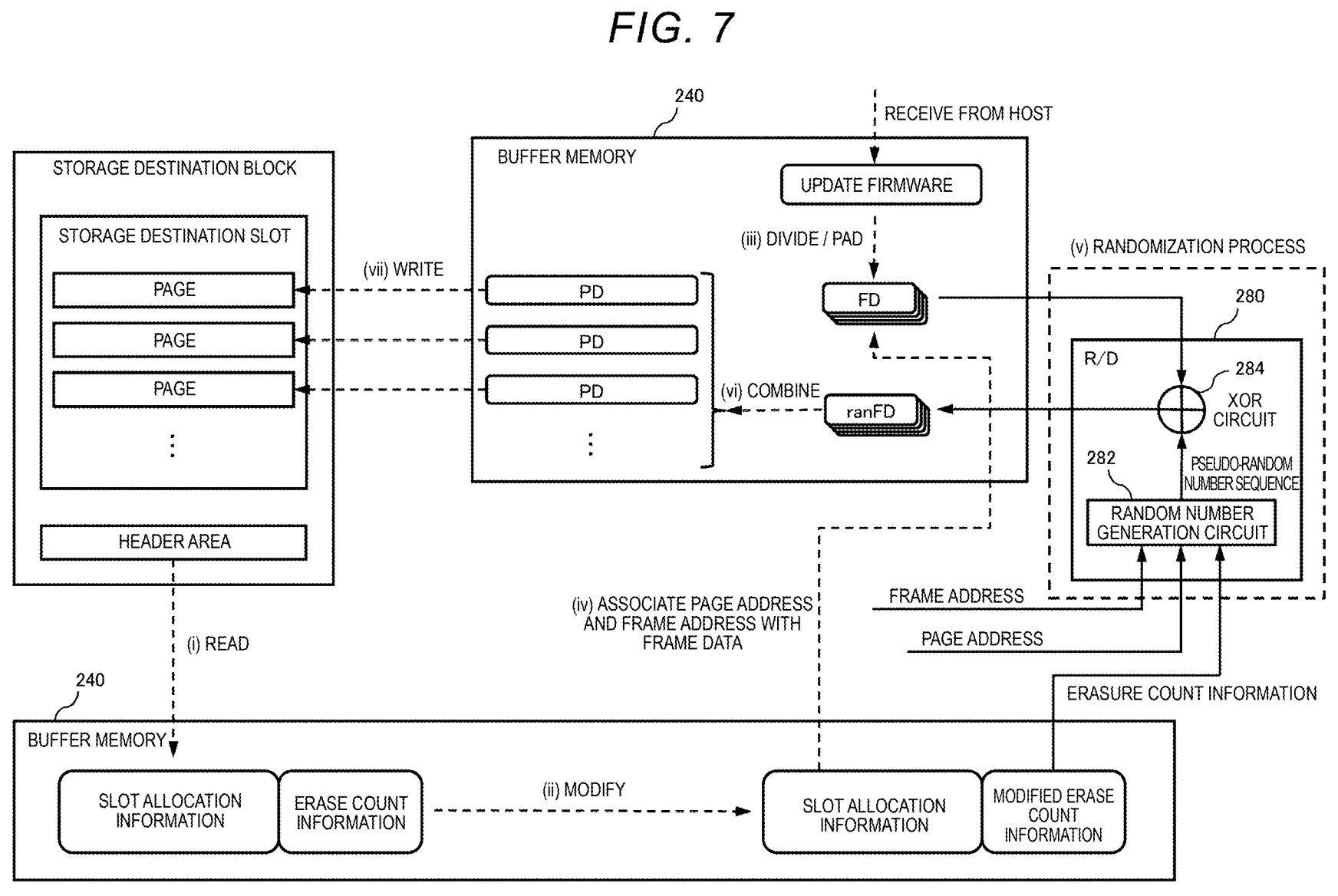

240
BUFFER MEMORY
RECEIVE FROM HOST
UPDATE FIRMWARE
(iii) DIVIDE / PAD
FD
ranFD
(vi) COMBINE
PD
PD
PD
...
(v) RANDOMIZATION PROCESS
280
284
XOR CIRCUIT
PSEUDO-RANDOM NUMBER SEQUENCE
R/D
282
RANDOM NUMBER GENERATION CIRCUIT
ERASURE COUNT INFORMATION
FRAME ADDRESS
PAGE ADDRESS
(iv) ASSOCIATE PAGE ADDRESS AND FRAME ADDRESS WITH FRAME DATA
(vii) WRITE
STORAGE DESTINATION BLOCK
STORAGE DESTINATION SLOT
PAGE
PAGE
PAGE
...
HEADER AREA
(i) READ
240
BUFFER MEMORY
SLOT ALLOCATION INFORMATION
ERASE COUNT INFORMATION
(ii) MODIFY
SLOT ALLOCATION INFORMATION
MODIFIED ERASE COUNT INFORMATION

FIG. 12

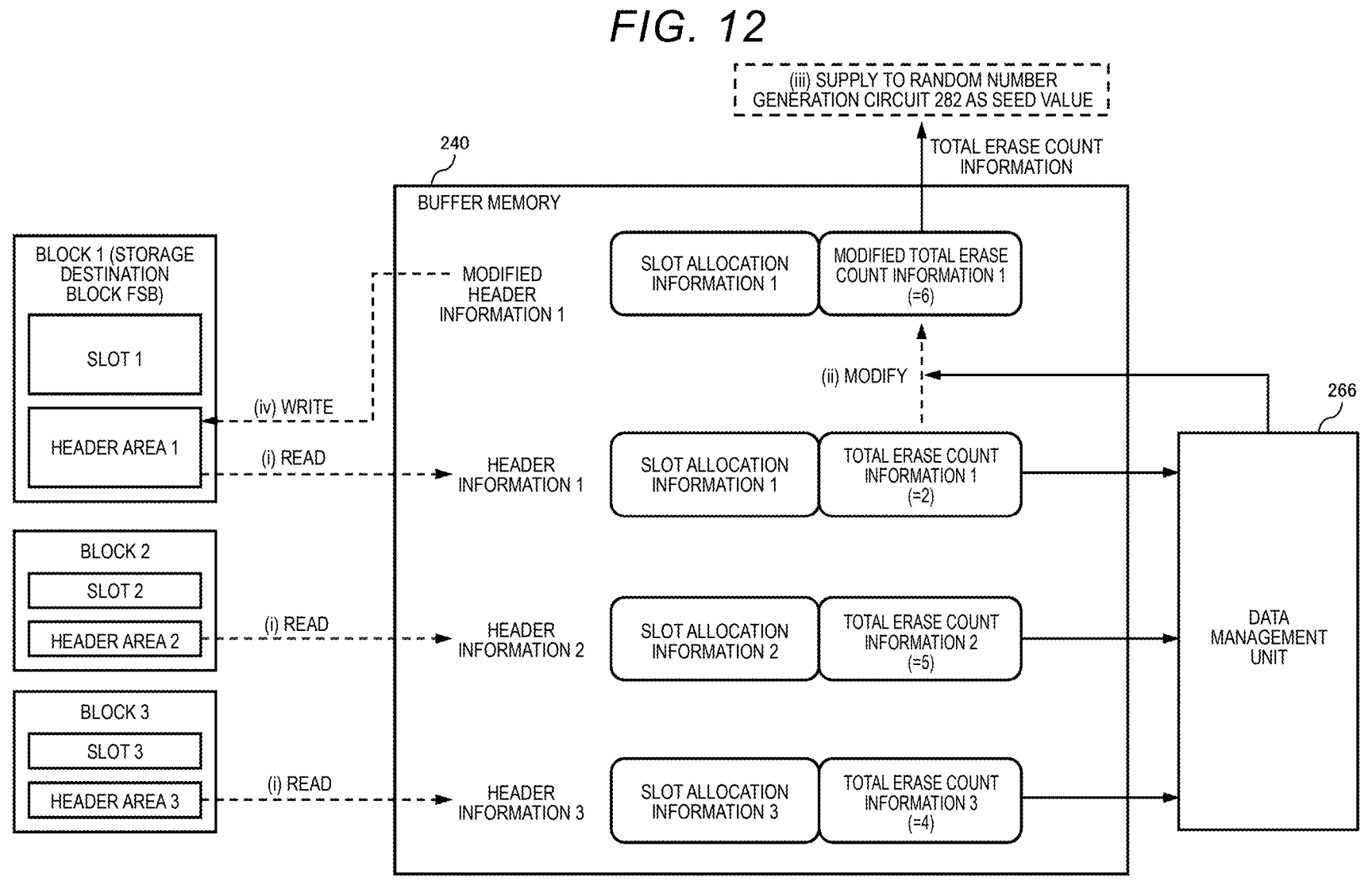

(iii) SUPPLY TO RANDOM NUMBER GENERATION CIRCUIT 282 AS SEED VALUE

TOTAL ERASE COUNT INFORMATION

266

DATA MANAGEMENT UNIT

240

BUFFER MEMORY

MODIFIED HEADER INFORMATION 1

SLOT ALLOCATION INFORMATION 1

MODIFIED TOTAL ERASE COUNT INFORMATION 1 (=6)

(ii) MODIFY

HEADER INFORMATION 1

SLOT ALLOCATION INFORMATION 1

TOTAL ERASE COUNT INFORMATION 1 (=2)

HEADER INFORMATION 2

SLOT ALLOCATION INFORMATION 2

TOTAL ERASE COUNT INFORMATION 2 (=5)

HEADER INFORMATION 3

SLOT ALLOCATION INFORMATION 3

TOTAL ERASE COUNT INFORMATION 3 (=4)

(iv) WRITE (i) READ (i) READ (i) READ

BLOCK 1 (STORAGE DESTINATION BLOCK FSB)

SLOT 1

HEADER AREA 1

BLOCK 2

SLOT 2

HEADER AREA 2

BLOCK 3

SLOT 3

HEADER AREA 3

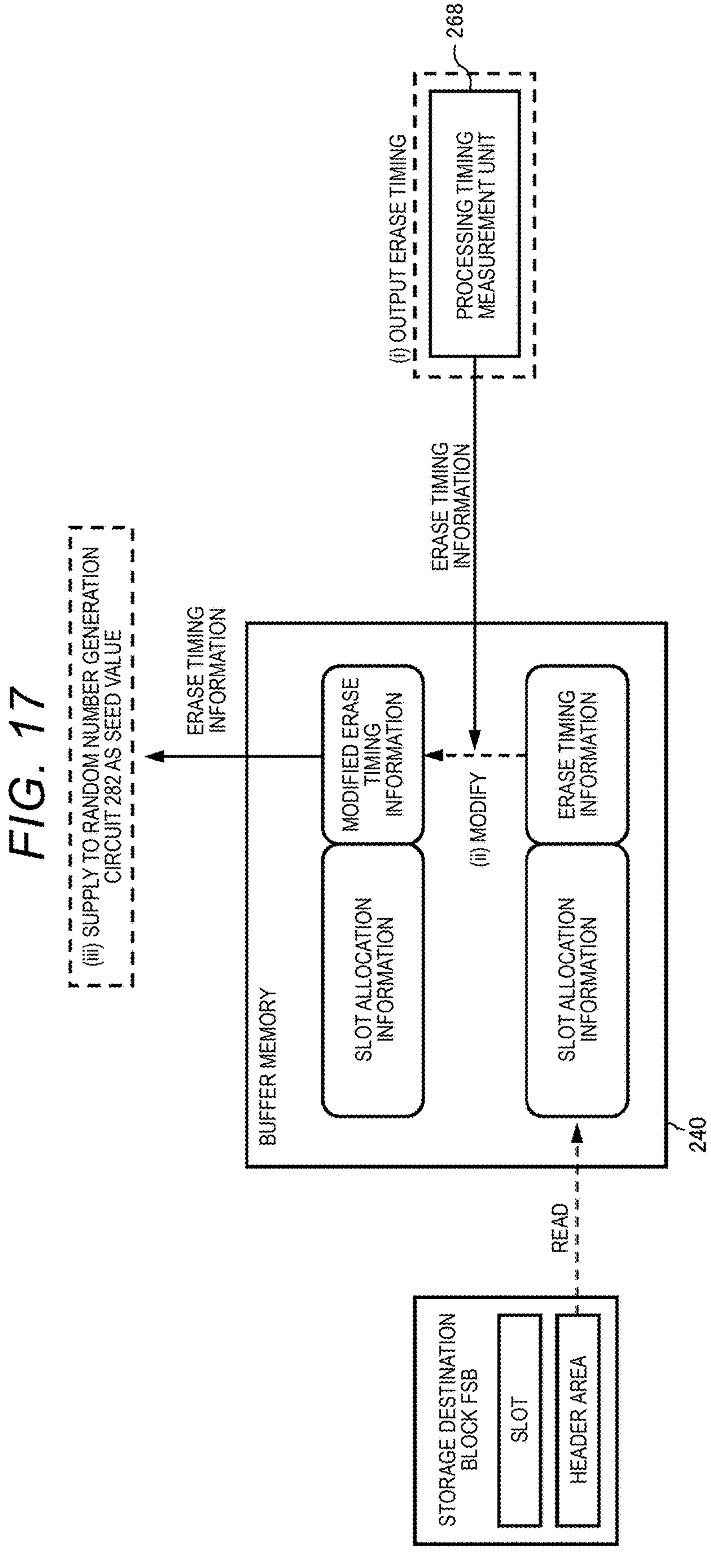
FIG. 17
268
(i) OUTPUT ERASE TIMING
PROCESSING TIMING MEASUREMENT UNIT
ERASE TIMING INFORMATION
(iii) SUPPLY TO RANDOM NUMBER GENERATION CIRCUIT 282 AS SEED VALUE
ERASE TIMING INFORMATION
BUFFER MEMORY
SLOT ALLOCATION INFORMATION
MODIFIED ERASE TIMING INFORMATION
(ii) MODIFY
SLOT ALLOCATION INFORMATION
ERASE TIMING INFORMATION
240
READ
STORAGE DESTINATION BLOCK FSB
SLOT
HEADER AREA

FIG. 21

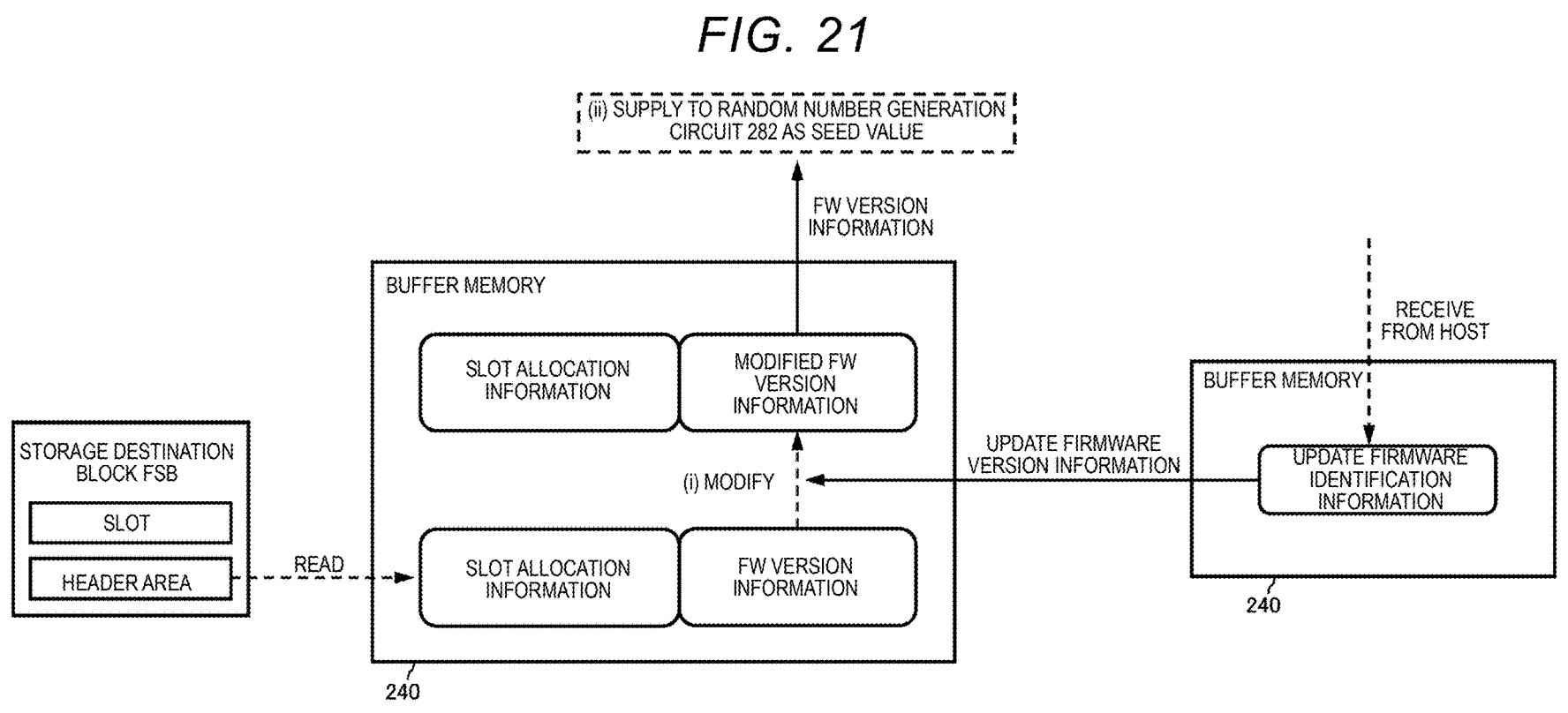

STORAGE DESTINATION BLOCK FSB

SLOT

HEADER AREA

READ

BUFFER MEMORY

240

SLOT ALLOCATION INFORMATION

FW VERSION INFORMATION (i) MODIFY

SLOT ALLOCATION INFORMATION

MODIFIED FW VERSION INFORMATION

FW VERSION INFORMATION (ii) SUPPLY TO RANDOM NUMBER GENERATION CIRCUIT 282 AS SEED VALUE

UPDATE FIRMWARE VERSION INFORMATION

BUFFER MEMORY

240

UPDATE FIRMWARE IDENTIFICATION INFORMATION

RECEIVE FROM HOST

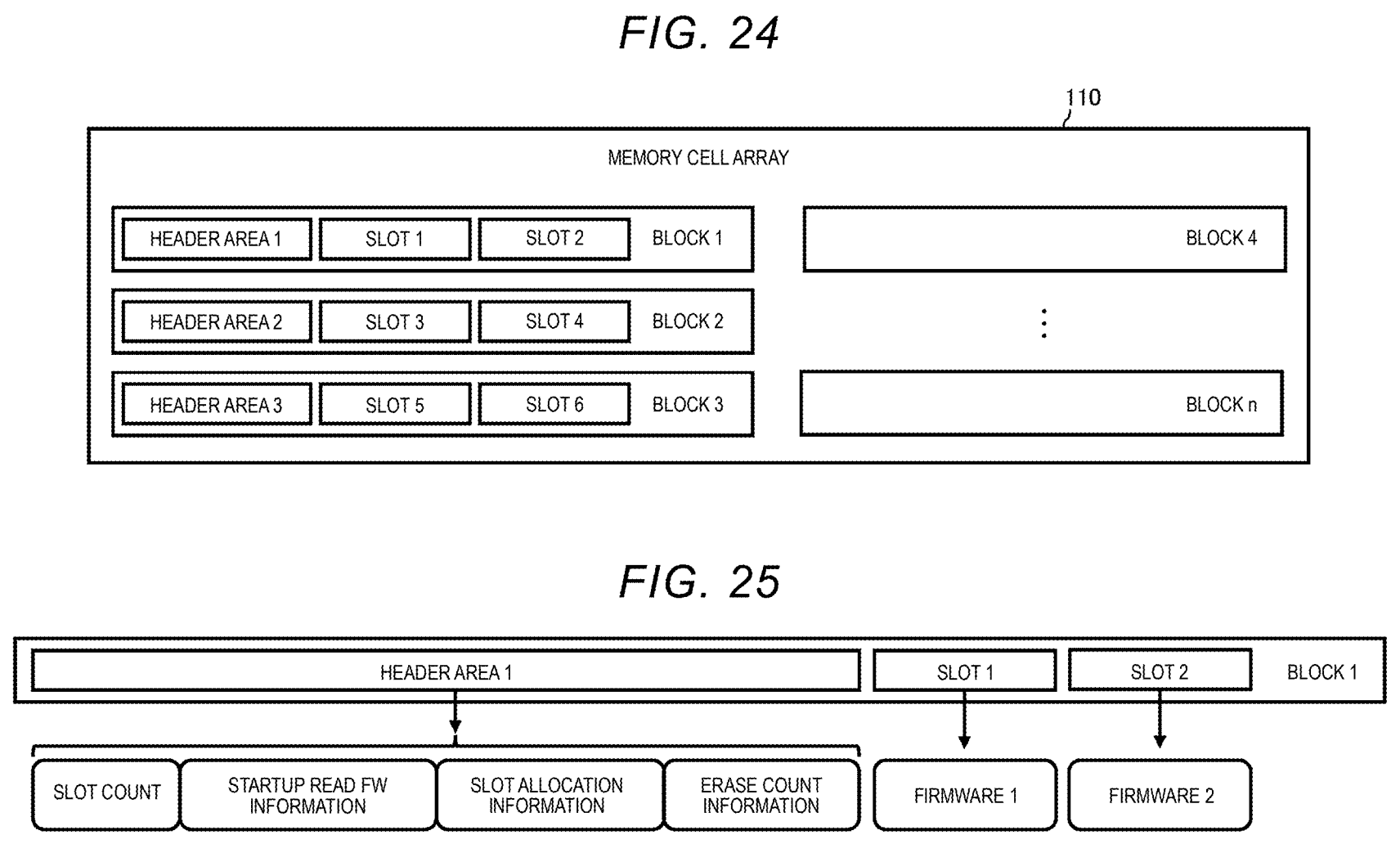

MEMORY CELL ARRAY

HEADER AREA 1
SLOT 1
SLOT 2
BLOCK 1

HEADER AREA 2
SLOT 3
SLOT 4
BLOCK 2

HEADER AREA 3
SLOT 5
SLOT 6
BLOCK 3

BLOCK 4

...

BLOCK n

FIG. 25

HEADER AREA 1
SLOT 1
SLOT 2
BLOCK 1

SLOT COUNT
STARTUP READ FW INFORMATION
SLOT ALLOCATION INFORMATION
ERASE COUNT INFORMATION
FIRMWARE 1
FIRMWARE 2

FIG. 28

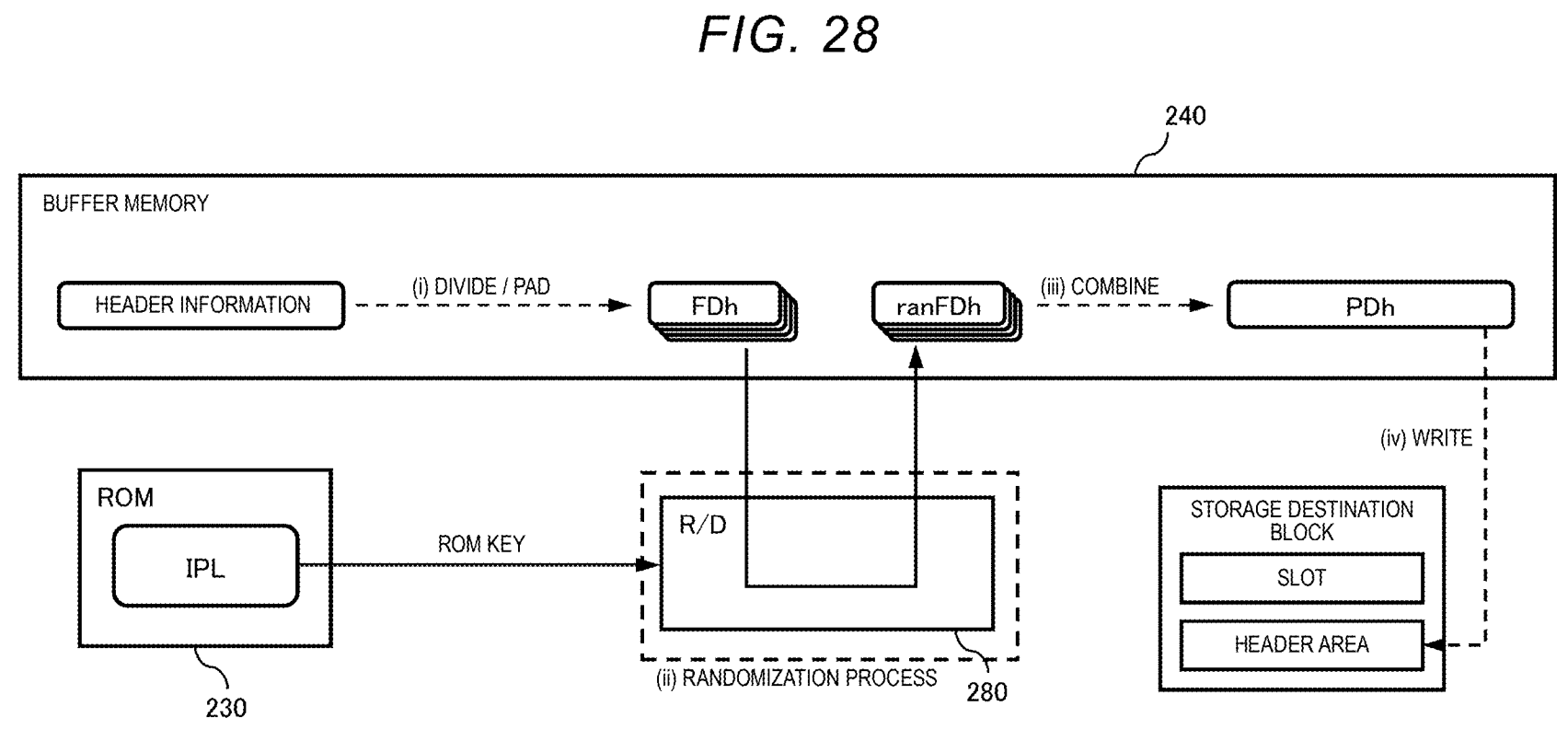

240
BUFFER MEMORY
HEADER INFORMATION
(i) DIVIDE / PAD
FDh
ranFDh
(iii) COMBINE
PDh
(iv) WRITE
STORAGE DESTINATION BLOCK
SLOT
HEADER AREA
280
R/D
(ii) RANDOMIZATION PROCESS
ROM KEY
ROM
IPL
230

MEMORY SYSTEM CAPABLE OF CONVERTING DATA

CROSS-REFERENCE TO RELATED APPLICATION(S)

This application is based upon and claims the benefit of priority from Japanese Patent Application No. 2024-045361, filed Mar. 21, 2024, the entire contents of which are incorporated herein by reference.

FIELD

Embodiments described herein relate generally to a memory system.

BACKGROUND

A memory system including a non-volatile memory such as a NAND flash memory and a memory controller that controls the non-volatile memory is known.

DESCRIPTION OF THE DRAWINGS

FIG. 5 shows a detailed configuration of a randomization circuit according to the first embodiment.

FIG. 7 shows an outline of the firmware update process according to the first embodiment.

FIG. 12 shows an outline of reading header information, a header information modification process, and a seed value setting process according to the second embodiment.

FIG. 17 shows an outline of a header information modification process and a seed value setting process according to the third embodiment.

FIG. 21 shows an outline of a header information modification process and a seed value setting process according to the fourth embodiment.

FIG. 24 shows a schematic configuration of data stored in a block according to a fifth embodiment.

FIG. 25 shows an internal configuration of a firmware block according to the fifth embodiment.

FIG. 28 shows an outline of a header information write operation according to a sixth embodiment.

DETAILED DESCRIPTION

Figure 1:
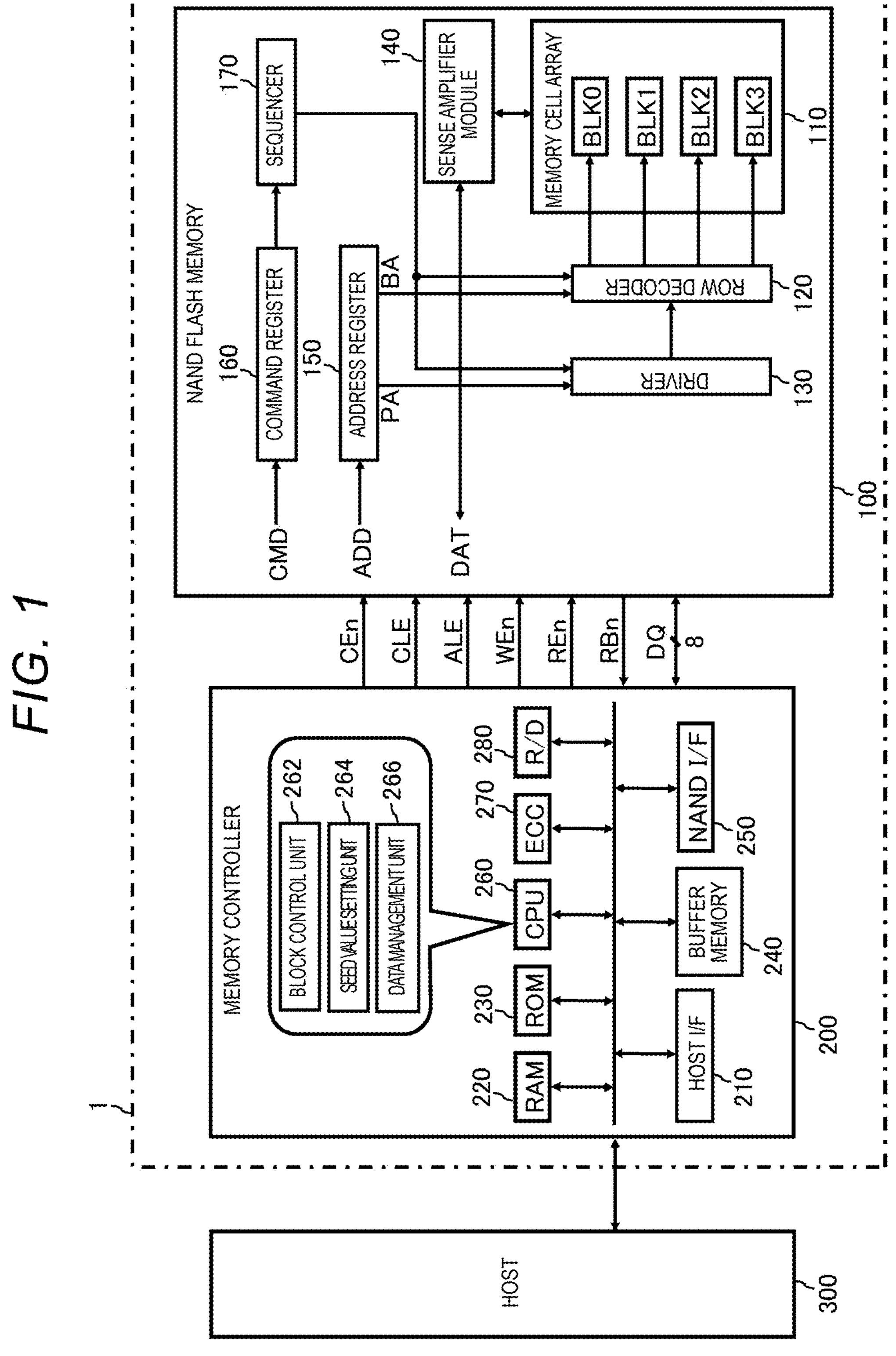
FIG. 1 shows a configuration of a memory system according to a first embodiment.

Embodiments provide a memory system capable of improving reliability of a memory.

In general, according to one embodiment, the memory system can be connected to the host. A memory system includes a non-volatile memory and a controller. The non-volatile memory includes a plurality of blocks, each of which is a unit of an erase operation. The controller is electrically connected to the non-volatile memory and controls the non-volatile memory. The controller receives first data from the host. The controller generates third data from the first data by randomizing the first data using second data that varies depending on the number of erase operations executed on a first block which is one of the plurality of blocks. The controller writes the second data to the non-volatile memory and the third data to the first block.

Embodiments are described below with reference to the drawings. In the following description, elements having substantially the same function and configuration are designated by the same numeral, and the repeated description may be omitted. Descriptions of certain embodiments are applicable as descriptions of other embodiments unless explicitly or obviously excluded.

The size of the shapes in the drawings or the size relationship between the shapes do not indicate the actual size or the actual size relationship of the configuration and data shown by the shapes.

It is possible to provide each functional block as hardware, computer software, or a combination of both. Therefore, each functional block is generally described from the viewpoint of these functions so that it is clear that each functional block is any of these. In addition, it is not essential that each functional block is depicted as in the following example. For example, some functions may be executed by a functional block different from the depicted functional block. Furthermore, the depicted functional block may be subdivided into finer functional subblocks.

Further, the steps in the flow of the method according to the embodiment are not limited to the order of the example, and may be executed in a different order from the example and/or in parallel with other steps unless otherwise indicated.

In the present specification and what is claimed, the expression that a certain first element is "connected to" another second element includes that the first element is connected to the second element directly or via an element that is constantly or selectively conductive.

1. First Embodiment

A memory system according to a first embodiment will be described. In the following, a NAND flash memory as a non-volatile memory and a memory system including the NAND flash memory will be described as an example.

1.1 Outline

In a memory system using a NAND flash memory as a storage medium, there is an issue that the reliability of the memory is decreased when the same cell data is repeatedly programmed into the same memory cell. The cell data is data stored in one memory cell. In particular, in the memory cell of the block in which update data is repeatedly written to the same physical address in the NAND flash memory, such as a block in which firmware is to be stored, the probability that the cell data to be programmed will be the same as the cell data programmed before the update increases. In addition, when any one of a plurality of pieces of data stored in such a block is updated, the data that is not to be updated is rewritten with the same data as before the erase operation for the block. Therefore, there is a concern that the reliability of the memory may be further reduced. As an approach to such an issue, it is conceivable that a memory controller or the like that controls write operations processes the data to be written and converts the data to be written into different data before writing to the block.

One of the processes performed on the data before writing the data to be written is known as a randomization process. The randomization process is performed to prevent concentration of data patterns. In this process, a pseudo-random number sequence is generated, and a logical operation (for example, an exclusive OR, addition, or multiplication) is performed between the data to be written and the pseudo-random number sequence. During writing data to and reading data from the NAND flash memory, a pseudo-random number sequence is generated using a randomization key (hereinafter, also referred to as a key or a seed value), and a data randomization process and a randomization undo process (hereinafter, also referred to as a de-randomization process) are performed using the generated pseudo-random number sequence. Due to the nature of the pseudo-random number, pseudo-random number sequences generated by using the same randomization key and the same randomization circuit are the same. Since the logical operation between the same data to be written and the same pseudo-random number sequence yields the same result, the randomization process using the same randomization key every time cannot solve the above-described issue.

Therefore, in the first embodiment, the memory controller performs the randomization process on data to be written to a block using a different randomization key each time an erase operation is performed on the block, preventing the same cell data from being repeatedly programmed into the same memory cell.

Hereinafter, a case where the memory controller executes write, read, and erase operations of the firmware will be described as an example. However, even when the memory controller executes write, read, and erase operations of data other than the firmware, it is possible to obtain the same effects by using the same configuration. The memory controller may also be referred to as a controller in the present application.

1.2 Configuration

A configuration of the memory system according to the first embodiment will be described.

1.2.1 Configuration of Memory System

First, an outline of a configuration of the memory system according to the first embodiment will be described with reference to FIG. 1.

As shown in FIG. 1, a memory system 1 includes a non-volatile memory (e.g., NAND flash memory) 100 and a memory controller 200. The memory system 1 may be configured with a plurality of semiconductor chips. The NAND flash memory 100 and the memory controller 200 may be combined to form one memory system 1, for example. Examples of the memory system include a universal flash storage (UFS) device, a memory card such as an SD™ card, a solid state drive (SSD), or an embedded multimedia card (eMMC).

The NAND flash memory 100 includes a plurality of memory cells (hereinafter, also referred to as memory cell transistors MT) and stores data in a non-volatile manner. The NAND flash memory 100 may have, for example, a structure in which a memory chip MC and a CMOS chip CC are bonded to each other.

The memory controller 200 is connected to the NAND flash memory 100 by a NAND bus and is connected to a host 300 by a host bus. The memory controller 200 controls the NAND flash memory 100. In addition, the memory controller 200 accesses the NAND flash memory 100 in response to a command received from the host 300.

The host 300 is, for example, a mobile phone, a tablet, a personal computer, a server, an automobile, and the like. The host 300 complies with, for example, an SD™ interface, serial attached SCSI (Small Computer System Interface) (SAS), serial ATA (Advanced Technology Attachment) (SATA), Peripheral Component Interconnect express (PCI EXPRESS™) (PCIe), or non-volatile memory express (NVM EXPRESS™) (NVMe).

The NAND bus communicates signals according to a NAND interface. Examples of signals of the NAND interface include a chip enable signal CEn, a command latch enable signal CLE, an address latch enable signal ALE, a write enable signal WEn, a read enable signal REn, a ready/busy signal RBn, and an input/output signal DQ. In the following description, when the suffix "n" is added to the signal name, the signal employs negative logic. That is, "n" indicates that the signal is asserted at an "L (Low)" level.

The signal CEn is a signal for enabling the NAND flash memory 100 and is asserted at an "L" level. The signals CLE and ALE notify the NAND flash memory 100 that the signal DQ to the NAND flash memory 100 contains a command and an address, respectively. The signal WEn is asserted at an "L" level and is a signal for taking in the signal DQ into the NAND flash memory 100. The signal REn is also asserted at an "L" level and is a signal for reading the signal DQ from the NAND flash memory 100. The signal RBn indicates whether the NAND flash memory 100 is in a ready state (for example, a state capable of receiving a command from the memory controller 200) or in a busy state (for example, a state incapable of receiving a command from the memory controller 200), and an "L" level indicates the busy state. The signal DQ is, for example, an 8-bit signal. The signal DQ contains data communicated between the NAND flash memory 100 and the memory controller 200, and may contain a command CMD, an address ADD, or data DAT such as write data and read data.

1.2.2 Configuration of NAND Flash Memory

Next, a configuration of the NAND flash memory 100 will be described. As shown in FIG. 1, the NAND flash memory 100 includes a memory cell array 110, a row decoder 120, a driver 130, a sense amplifier module 140, an address register 150, a command register 160, and a sequencer 170.

The memory cell array 110 includes a plurality of blocks BLK, each including a plurality of non-volatile memory cells associated with rows and columns. Erasing of the data stored in the memory cell array 110 is performed in units of blocks BLK. FIG. 1 shows four blocks BLK0 to BLK3 as an example. The memory cell array 110 stores data given by the memory controller 200.

The row decoder 120 selects one of the blocks BLK0 to BLK3 based on a block address in the address register 150, and further selects a word line in the selected block BLK.

The driver 130 supplies a voltage to the selected block BLK via the row decoder 120 based on a page address PA in the address register 150.

The sense amplifier module 140 determines the data based on the threshold voltages of memory cell transistors MT in the memory cell array 110 during sensing of data. The sense amplifier module 140 outputs the determination result to the memory controller 200 as read data DAT. The sense amplifier module 140 transfers the write data DAT received from the memory controller 200 to the memory cell array 110 during programming of data.

The address register 150 temporarily stores the address ADD received from the memory controller 200. The address ADD includes the block address and the page address described above. The address ADD is, for example, a number. The command register 160 temporarily stores the command CMD received from the memory controller 200.

The sequencer 170 controls the operation of the entire NAND flash memory 100 based on the command CMD stored in the command register 160.

Figure 2:
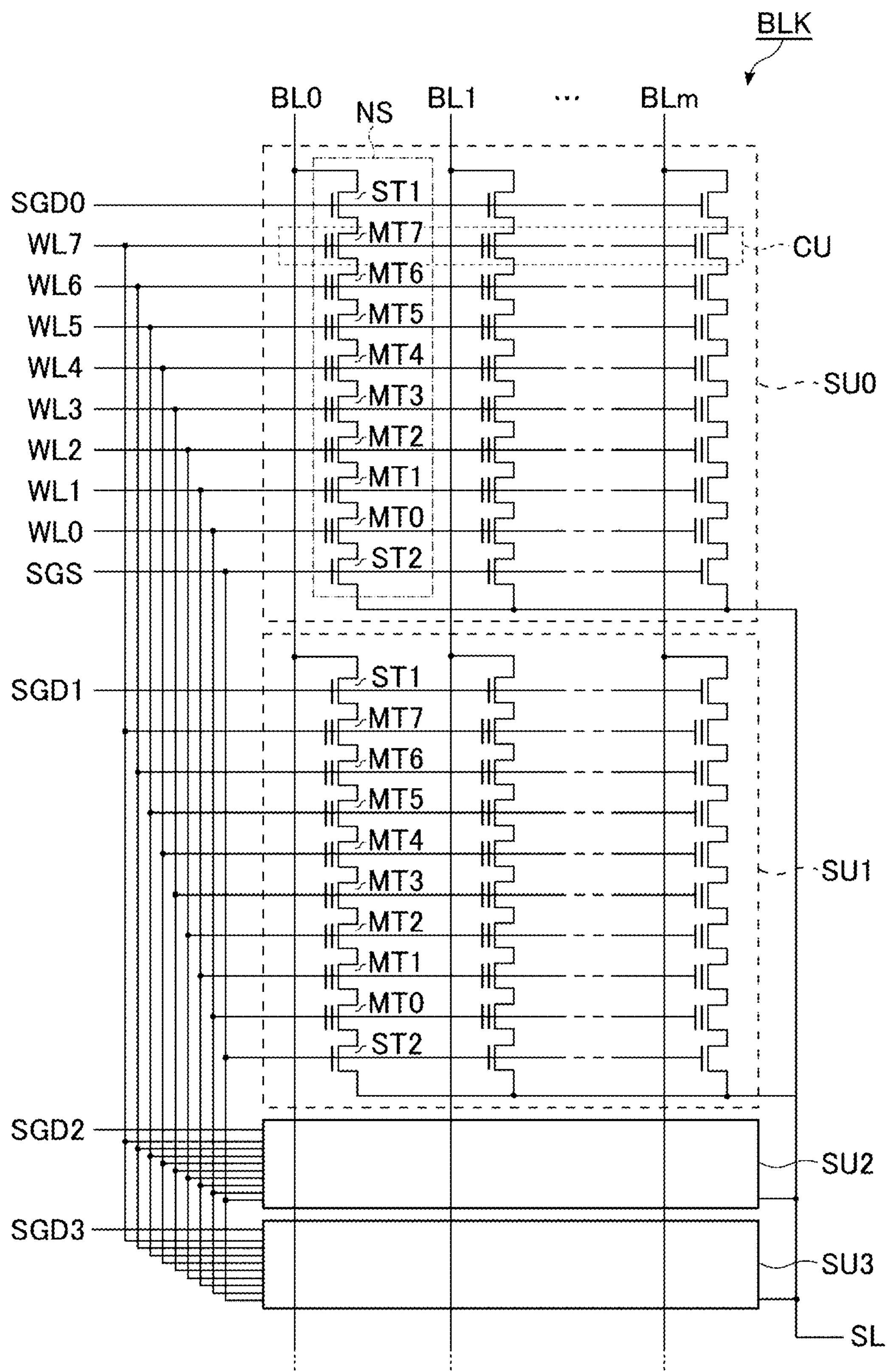
FIG. 2 shows a circuit configuration of a block of memory cells in the memory system according to the first embodiment.

Next, a circuit configuration of the block BLK will be described with reference to FIG. 2. FIG. 2 is a circuit diagram of one of the blocks BLK.

As shown in FIG. 2, the block BLK includes, for example, four string units SU (SU0 to SU3). Further, each of the string units SU includes a plurality of NAND strings NS.

Each of the NAND strings NS includes, for example, eight memory cell transistors MT (MT0 to MT7), and select transistors ST1 and ST2. The memory cell transistor MT includes a control gate and a charge storage layer, and stores data in a non-volatile manner. The memory cell transistors MT are connected in series between the source of the select transistor ST1 and the drain of the select transistor ST2. Each memory cell transistor MT is capable of storing 2 bits or more of data.

The gates of the select transistors ST1 included in the plurality of NAND strings NS of each of the string units SU0 to SU3 are connected to select gate lines SGD0 to SGD3, respectively. Meanwhile, the gates of the select transistors ST2 included in the plurality of NAND strings NS of each of the string units SU0 to SU3 are commonly connected to, for example, a select gate line SGS. Alternatively, the gates of the select transistors ST2 included in the plurality of NAND strings NS of each of the string units SU0 to SU3 may be connected to select gate lines SGS0 to SGS3 that differ for each string unit. In addition, the control gates of the memory cell transistors MT0 to MT7 included in the plurality of NAND strings NS in the same block BLK are commonly connected to word lines WL0 to WL7, respectively.

In addition, the drains of the select transistors ST1 of the NAND string NS in the same column in the plurality of blocks BLK in the memory cell array 110 are commonly connected to a bit line BL (one of BL0 to BLm, where m is a natural number of 1 or more). That is, the bit line BL commonly connects the NAND strings NS in the same column across the plurality of blocks BLK. Further, the sources of a plurality of select transistors ST2 are commonly connected to the source line SL.

A set of a plurality of memory cell transistors MT included in the same string unit SU and connected to the same word line WL is referred to as, for example, a cell unit CU. The cell unit CU includes N pages, which are storage areas, in accordance with the number N of bits of the cell data stored in each memory cell transistor MT. For example, one page stores a group of data each of which is one bit and is located at the same bit position of data stored in each of the memory cell transistors MT of one cell unit CU. Hereinafter, a storage capacity of one page is referred to as a page size.

In programming of data into the memory cell array 110, for example, the data stored in each of the N pages in the cell unit CU is programmed into the cell unit CU at one time. The data stored in the memory cell array 110 is sensed for each page. The page to be programmed and sensed is designated by the page address provided in the address ADD received from the memory controller 200.

The memory controller 200 may perform various operations on data in units of divided pages (hereinafter, referred to as frames), obtained by dividing one page into predetermined units. Hereinafter, a storage capacity of one frame is referred to as a frame size.

The memory cell array 110 may have a circuit configuration other than the above. For example, the number of blocks in the memory cell array 110, the number of string units SU provided in the block BLK, the number of memory cell transistors MT in the NAND string NS, and the number of select transistors ST1 and ST2 in the NAND string NS may be designed to be any number.

Figures 3, 4:
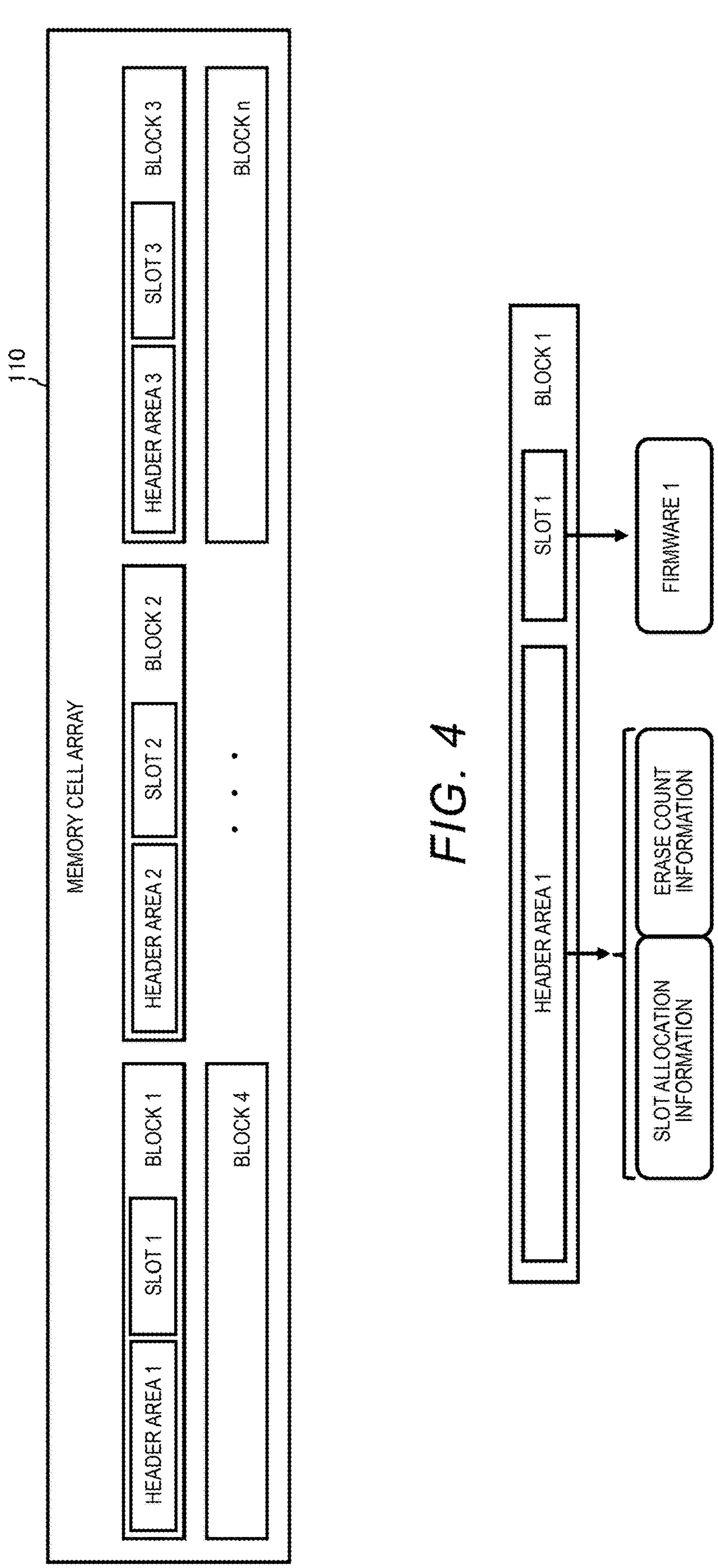
FIG. 3 shows a configuration of data stored in the block according to the first embodiment.
FIG. 4 shows an internal configuration of a firmware block according to the first embodiment.

Next, a configuration of data stored in the block BLK according to the first embodiment will be described with reference to FIG. 3. The NAND flash memory 100 is capable of storing a plurality of firmware. FIG. 3 shows an example in which the memory system 1 is configured to store three firmware.

The blocks 1 to 3 are blocks for storing firmware (hereinafter, referred to as a firmware block). In the firmware block according to the first embodiment, one slot and one header area are provided in one block. The slot is an area for storing the firmware. For example, one firmware is stored in one slot. The header area is an area for storing header information. The header information will be described below. The header area is set in, for example, one page in the firmware block. In FIG. 3, the slot 1 for storing the first firmware among the three firmware and the header area 1 are provided in the block 1. Similarly, the slot 2 for storing the second firmware among the three firmware and the header area 2 are provided in the block 2. In addition, the slot 3 for storing the third firmware among the three firmware and the header area 3 are provided in the block 3.

The firmware stored in the slot 1 may be different from the firmware stored in the slot 2 and the firmware stored in the slot 3, or may be the same firmware. The firmware stored in the slot 2 may be different from the firmware stored in the slot 3, or may be the same firmware. The firmware is randomized by a randomization circuit 280 to be described later and stored.

The blocks 4 to n (where n is a natural number of 5 or more) are blocks for storing user data.

When memory cell transistors MT is capable of storing 2 bits or more of data, the firmware block is used as, for example, a pseudo single level cell (pSLC) area. The pSLC area is a storage area in which 1 bit data is stored in the memory cell transistors MT capable of storing 2 bits or more of data.

Next, an internal configuration of the firmware block according to the first embodiment will be described with reference to FIG. 4. As shown in FIG. 4, the header information stored in the header area includes information used for the firmware update process or the decode process. The header information includes, for example, slot allocation information and a value based on the count of erase operations performed on a block (hereinafter, referred to as erase count information). The slot allocation information indicates a position of area set as a slot, and includes, for example, a page address corresponding to the slot, or a page address and a frame address corresponding to the slot. The erase count information is modified, for example, each time an erase operation is performed on the block. The erase count information, for example, is set to "0" at the time of shipment of the memory system 1.

The schematic configuration of the data stored in the block BLK and the internal configuration of the firmware block need not be achieved by the circuit configuration of the memory cell array 110, and at least in various operations, it is sufficient for the memory controller 200 or the sequencer 170 to recognize the function of each area.

1.2.3 Configuration of Memory Controller

Returning to FIG. 1, a configuration of the memory controller 200 will be described. Each function of the memory controller 200 may be carried out by a dedicated circuit or may be carried out by a processor 260 executing firmware.

The memory controller 200 is, for example, a system-on-a-chip (SoC). The memory controller 200 may be configured with a plurality of semiconductor chips. The memory controller 200 includes a host interface circuit (host I/F) 210, a random access memory (RAM) 220, a read only memory (ROM) 230, a buffer memory 240, a NAND interface circuit (NAND I/F) 250, a processor (CPU) 260, an ECC circuit 270, and a randomization circuit (R/D) 280.

The host interface circuit 210 is connected to the host 300 via a host bus. The host interface circuit 210 transfers the command and the data received from the host 300 to the buffer memory 240 and the processor 260, respectively. Further, the host interface circuit 210 transfers the data in the buffer memory 240 to the host 300 in response to instructions from the processor 260.

The RAM 220 is, for example, a static random access memory (SRAM). The RAM 220 is used as a work space of the processor 260. The RAM 220 temporarily stores, for example, an update program UDP, an address table AT, and the firmware read from the NAND flash memory 100.

The update program UDP is a program for updating the firmware according to the first embodiment. The update program UDP is stored in the NAND flash memory 100. The update program UDP is read from the NAND flash memory 100 to the RAM 220 in due time. When the memory controller 200 executes the firmware update, the processor 260 executes the update program UDP stored in the RAM 220. The update program UDP may be a part of firmware.

The address table AT is a table for managing a storage destination address (logical address) of data designated by the host 300 and a position in the NAND flash memory 100 (physical address) corresponding to the storage destination address. For example, in the firmware update process, the logical address is a slot address, and the physical address is a block address.

The ROM 230 is configured with, for example, a mask ROM. Alternatively, the ROM 230 may be a serial flash ROM. The ROM 230 stores an initial program loader (IPL). The IPL is a program for reading the firmware from the NAND flash memory 100.

The buffer memory 240 is, for example, a dynamic random access memory (DRAM). The buffer memory 240 temporarily stores write data and read data.

The NAND interface circuit 250 is connected to the NAND flash memory 100 via a NAND bus and controls communication with the NAND flash memory 100. The NAND interface circuit 250 outputs the signals CEn, ALE, CLE, WEn, and REn to the NAND flash memory 100 based on the instruction received from the processor 260. In addition, during writing of data, the NAND interface circuit 250 transfers the write command and the write destination address issued by the processor 260, and write data in the buffer memory 240 to the NAND flash memory 100 as the signal DQ. During reading of data, the NAND interface circuit 250 transfers the read command and the read destination address issued by the processor 260 to the NAND flash memory 100 as the signal DQ. Further, the NAND interface circuit 250 receives the data read from the NAND flash memory 100 as the signal DQ and transfers the data to the buffer memory 240.

The processor 260 controls the operation of the entire memory controller 200. For example, the processor 260 executes various operations by executing the firmware loaded on the RAM 220 from the NAND flash memory 100.

The processor 260 functions as, for example, a block control unit 262, a seed value setting unit 264, and a data management unit 266. The processor 260 functions as each of these units, for example, by executing the firmware.

The block control unit 262 performs write, read, and erase operations on the NAND flash memory 100 based on a command received from the host 300, for example. At this time, the block control unit 262, for example, refers to the address table AT stored in the RAM 220 and identifies the area to be processed for each process in the NAND flash memory 100. In addition, the block control unit 262 reads the firmware from the NAND flash memory 100 in accordance with the IPL during the startup of the memory system 1.

The seed value setting unit 264 supplies a seed value used for generating a pseudo-random number sequence to a random number generation circuit 282 to be described below.

The data management unit 266 manages and edits various data stored in the RAM 220 or the buffer memory 240. Specifically, the data management unit 266 performs arithmetic operations and other processes on the data stored in the buffer memory 240. In addition, the data management unit 266 divides or combines, for example, write requested data received from the host 300 into a size equal to the frame size or a size which becomes equal to the frame size after an error-correction encoding process is applied. The error-correction encoding process will be described later. Hereinafter, the frame size may imply a size which becomes equal to the frame size after the error-correction encoding process is applied. In addition, the data management unit 266 divides or combines the write requested data into a size equal to the page size. The data management unit 266 performs padding on the write requested data so that the write requested data has the same size as the frame size or the page size. Hereinafter, data having the same size as the frame size is referred to as frame data FD. The data having the same size as the page size is referred to as page data PD.

The ECC circuit 270 performs encoding on the data to be written to the NAND flash memory 100. In addition, the ECC circuit 270 performs decoding on the data read from the NAND flash memory 100. The encoding and decoding are processes required for error detection and correction of data. Specifically, the ECC circuit 270 performs the error-correction encoding process on the data to be written to the NAND flash memory 100. In some cases, data including information for error correction may be generated from the write requested data by error correction encoding process based on an error correction code generation method. After the error correction encoding process, the data is written to the NAND flash memory 100. In the error correction decoding process, the ECC circuit 270 detects an error in the data read from the NAND flash memory 100 and attempts to correct the error when there is an error in the data.

The randomization circuit (R/D) 280 performs the randomization process on the data to be written to the NAND flash memory 100. In addition, the randomization circuit 280 performs the de-randomization process on the data read from the NAND flash memory 100.

FIG. 5 shows a detailed configuration of the randomization circuit 280. As shown in FIG. 5, the randomization circuit 280 includes a random number generation circuit 282 and an XOR circuit 284. The random number generation circuit 282 is, for example, a linear feedback shift register or a nonlinear conversion circuit. The random number generation circuit 282 outputs a pseudo-random number sequence based on an input seed value. FIG. 5 shows an example where three seed values are input to the random number generation circuit 282. The randomization circuit 280 executes the randomization process and the de-randomization process by executing an exclusive OR (XOR) between a pseudo-random number sequence output from the random number generation circuit 282 and input data. The randomization circuit may include two or more random number generation circuits 282 and the XOR circuits 284, respectively.

In the present description, the seed value is a value for setting an initial state of the random number generation circuit 282. The number of seed values used for generating a pseudo-random number sequence is not limited to three, and may be one, two, or four or more. In the first embodiment, the seed value is supplied from the processor 260.

The generation of the pseudo-random number sequence and the calculation of the exclusive OR between the pseudo-random number sequence and the input data in the randomization circuit using the linear feedback shift register are described in, for example, U.S. patent application Ser. No. 15/253,757, filed on Aug. 31, 2016. In addition, the generation of the pseudo-random number sequence and the calculation of the exclusive OR of the pseudo-random number sequence and the input data in the randomization circuit using the nonlinear conversion circuit are described, for example, in U.S. patent application Ser. No. 17/200,264, filed on Mar. 12, 2021. The entire contents of these patent applications are incorporated herein by reference.

In the following, an example in which the memory controller 200 divides one page into four frames and performs the data randomization process, the data de-randomization process, the encoding process, and the decoding process for each of the divided frames will be described. That is, in the present description, the number of frames per page is 4.

1.3 Operation

Next, an operation of the memory system according to the first embodiment will be described.

1.3.1 Firmware Update Process

The firmware update process according to the first embodiment will be described.

Figure 6:
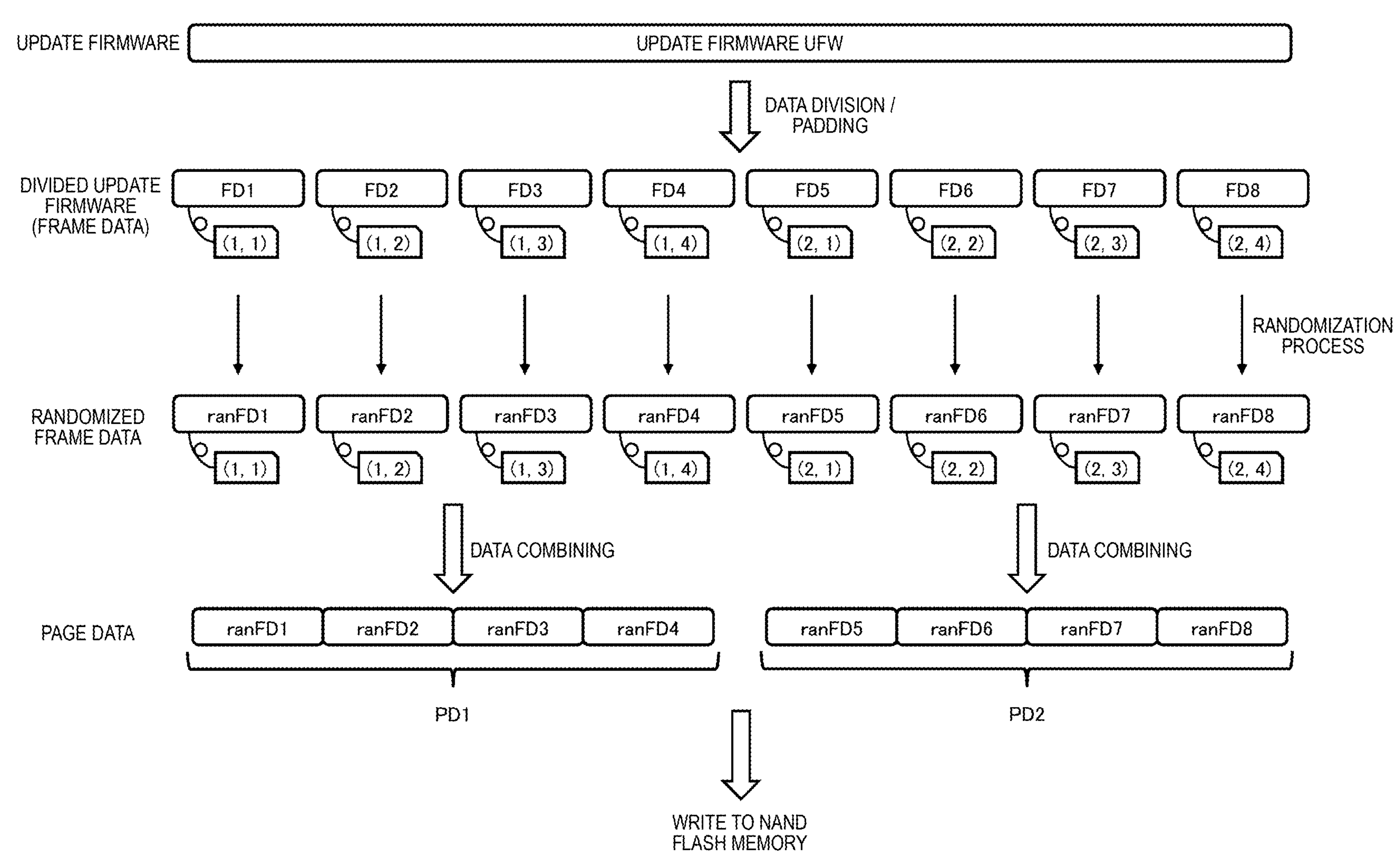
FIG. 6 shows an example of data processing for a firmware update process by a memory controller, according to the first embodiment.

FIG. 6 shows an example of data processing for a firmware update process by the memory controller 200 according to the first embodiment. As shown in the top of FIG. 6, the memory controller 200 receives an update firmware UFW having a certain data size from the host 300. When the update firmware UFW is received by the memory controller 200, the update firmware UFW is temporarily stored in, for example, the buffer memory 240. The firmware may be transmitted from the host in an encrypted manner. In the present description, the firmware includes such an encrypted firmware.

As shown in the second row of FIG. 6, the data management unit 266 divides and/or pads the update firmware UFW to generate a plurality of frame data FD. In FIG. 6, eight frame data FD (FD1 to FD8) are generated from the update firmware UFW. The frame data FD1 to FD8 may be arranged in this order in the update firmware UFW, for example. Alternatively, the frame data FD1 to FD8 may be at any position in the update firmware UFW.

When the number of pieces of the generated frame data FD is not an integer multiple of the number of frames per page (in the present description, 4), the data management unit 266 generates frame data FD configured with padding data (hereinafter, referred to as padding frame data) so that the total number of pieces of the generated frame data FD is an integer multiple of the number of frames per page.

The data management unit 266 associates the frame data FD with a pair of the page address and the frame address in the storage destination slot of the update firmware UFW. Hereinafter, a pair of page address a and frame address β may be described as (α, β). In FIG. 6, the data management unit 266 associates frame data FD1 to FD4 with (1,1) to (1,4) in order, and associates frame data FD5 to FD8 with (2,1) to (2,4) in order.

As shown in the third row of FIG. 6, the randomization circuit 280 performs the randomization process on the frame data FD to generate randomized frame data ranFD. The seed value used by the randomization circuit 280 to perform the randomization process is supplied from the seed value setting unit 264. The seed value used will be described later. The randomized frame data ranFD is encoded by the ECC circuit 270.

As shown in the fourth row of FIG. 6, the data management unit 266 combines the randomized frame data ranFD associated with the same page address to generate page data PD. Specifically, the data management unit 266 combines, for example, the randomized frame data ranFD in ascending order of the correlated frame addresses. Hereinafter, the page data PD associated with the page address a may be simply referred to as PDα. In FIG. 6, the data management unit 266 generates PD1 by combining ranFD1 to ranFD4, which are associated with the page address “1”, in ascending order of the correlated frame addresses (that is, in the order of 1 to 4), and generates PD2 by combining ranFD5 to ranFD8, which are associated with the page address “2”, in ascending order of the correlated frame addresses (that is, in the order of 1 to 4).

The block control unit 262 writes the page data PD (PD1 and PD2) to the NAND flash memory 100.

Next, an outline of the firmware update process according to the first embodiment will be described with reference to FIG. 7. In FIG. 7, the solid line arrows indicate the flow of data, and the dashed line arrows and squares indicate the process by the memory controller 200. In FIG. 7, two buffer memories 240 are shown, but this is for convenience only and does not mean that two buffer memories 240 need to be provided.

When the update process is initiated, the block control unit 262 reads the header information from the header area of the firmware block (corresponding to the storage destination block FSB to be described later) including the storage destination slot in which the update firmware UFW is stored ((i) of FIG. 7). The read header information is decoded by the ECC circuit 270 and temporarily stored in, for example, the buffer memory 240.

The block control unit 262 performs an erase operation on the storage destination block.

The data management unit 266 modifies the read header information. The data management unit 266 particularly modifies the erase count information in the header information ((ii) of FIG. 7). Specifically, the data management unit 266, for example, increments the erase count information by 1. However, the differences in values before and after the modification of the erase count information are not limited to 1, and it is sufficient that the value is at least modified.

In addition, the data management unit 266 divides and/or pads the update firmware received from the host to generate frame data FD ((iii) of FIG. 7). Further, the data management unit 266 associates the generated frame data FD with a pair of the page address and the frame address in the storage destination slot ((iv) of FIG. 7). During the association, the data management unit 266 refers to the slot allocation information in the header information.

The randomization circuit 280 subsequently performs the randomization process on the generated frame data FD to generate randomized frame data ranFD ((v) of FIG. 7).

During the frame data FD randomization process, the seed value setting unit 264 refers to the modified header information and supplies the erase count information to the random number generation circuit 282 as a seed value. In addition, the seed value setting unit 264 supplies the page address and the frame address associated with each frame data FD to the random number generation circuit 282 as seed values. In the randomization process, the random number generation circuit 282 generates a pseudo-random number sequence using the seed values supplied from the seed value setting unit 264, and supplies the pseudo-random number sequence to the XOR circuit 284. The XOR circuit 284 performs an XOR operation between the pseudo-random number sequence supplied from the random number generation circuit 282 and the frame data FD to generate randomized frame data ranFD. The randomized frame data ranFD is encoded by the ECC circuit 270.

The data management unit 266 combines the generated randomized frame data ranFD to generate page data PD ((vi) of FIG. 7).

The block control unit 262 writes the page data PD to the corresponding page in the storage destination slot ((vii) of FIG. 7). In addition, the block control unit 262 writes the modified header information to the header area of the storage destination block.

The above is an outline of the firmware update process according to the first embodiment. As described above, in the firmware update process according to the first embodiment, the memory controller 200 modifies the erase count information in the header information, and performs the randomization process on the update firmware using the modified erase count information as a seed value. That is, in the firmware randomization process, a different seed value is used each time a firmware update process (or erase operation of the storage destination block) is performed.

In the encoding process and the decoding process of the header information, the data management unit 266 performs dividing, padding, and combining of the header information as necessary.

Figure 8:
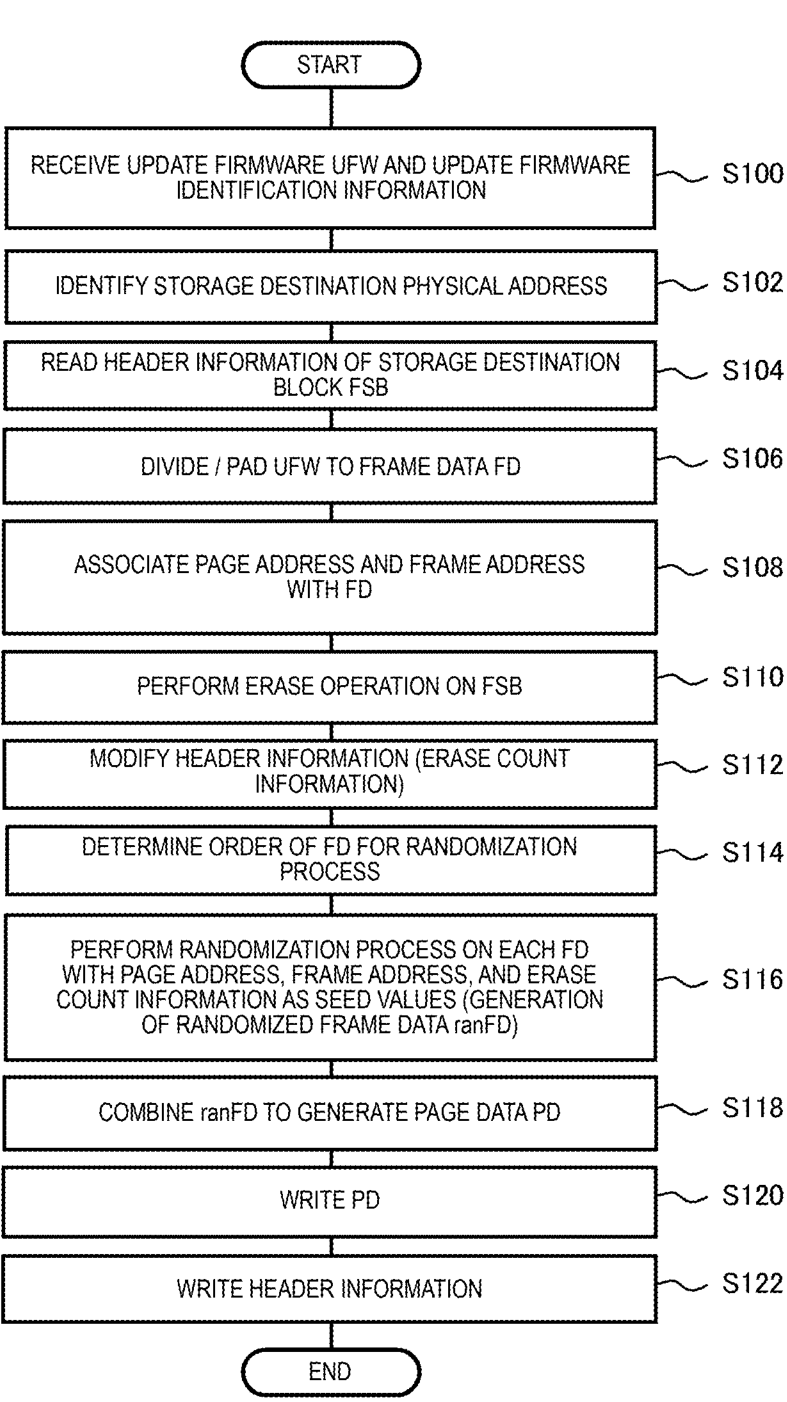
FIG. 8 shows a flow of the firmware update process according to the first embodiment.

FIG. 8 shows a flow of the firmware update process according to the first embodiment. FIG. 8 particularly shows a flow when the process as described with reference to FIGS. 6 and 7 is performed. The memory controller 200 initiates the firmware update process in response to receiving a firmware update request from the host 300. Specifically, the processor 260 executes the update program UDP, in response to receiving the firmware update request.

In step S100, the memory controller 200 receives the update firmware UFW and information for identifying the update firmware UFW (hereinafter, referred to as update firmware identification information) from the host 300. The update firmware identification information includes, for example, the storage destination slot address and version information of the update firmware UFW. The update firmware UFW and the update firmware identification information are temporarily stored in, for example, the buffer memory 240. At least one of the update firmware UFW and the update firmware identification information may be received from the host 300 before the execution of the update program UDP. In this case, the data received before the execution of the update program (UDP), among the update firmware (UFW) and the update firmware identification information, may be included in the firmware update request and received from the host 300.

In step S102, the memory controller 200 identifies a physical address of a storage destination slot, in which the update firmware UFW is stored, from the update firmware identification information. The memory controller 200 identifies the physical address of the storage destination slot, for example, by referring to the address table AT.

In step S104, the memory controller 200 (particularly, the block control unit 262) reads the header information of a block corresponding to the physical address of the storage destination slot (hereinafter, referred to as a storage destination block FSB). The read header information is decoded by the ECC circuit 270 and is temporarily stored in, for example, the buffer memory 240.

In step S106, the memory controller 200 divides and/or pads the update firmware UFW to generate frame data FD.

In step S108, the memory controller 200 refers to the slot allocation information in the header information, and respectively associate a pair of the page address and the frame address in the storage destination slot with the frame data FD generated in step S106.

In step S110, the memory controller 200 performs an erase operation on the storage destination block FSB.

In step S112, the memory controller 200 modifies the header information (particularly, the erase count information) stored in the buffer memory 240.

In step S114, the memory controller 200 determines the order of the frame data FD in which the randomization process is performed. The randomization process may be performed in parallel on a plurality of frame data FD.

In step S116, the memory controller 200 performs the randomization process on the frame data FD in the order determined in step S114, and generates randomized frame data ranFD. The memory controller 200 uses the modified erase count information, along with the page address and the frame address associated with the frame data FD, as seed values. The generated randomized frame data ranFD is associated with the page address and the frame address associated with the original frame data FD. The memory controller 200 may generate seed values by performing arithmetic operations and other processes on the erase count information, the page address, and/or the frame address, and may use the generated seed values for the randomization process. The randomized frame data ranFD is encoded by the ECC circuit 270.

In step S118, the memory controller 200 combines the randomized frame data ranFD associated with the same page address to generate page data PD. The generation of the page data PD is performed, for example, in ascending order of the page addresses provided in the storage destination slot.

In step S120, the memory controller 200 (particularly, the block control unit 262) writes the page data PD to the NAND flash memory 100. The page data PD is written to the area of the storage destination block FSB indicated by the page address corresponding to each page data PD.

In step S122, the memory controller 200 writes the modified header information to the NAND flash memory 100. The modified header information is encoded by the ECC circuit 270 and is written to the header area of the storage destination block FSB.

The firmware update process ends.

In the firmware update process, the padding frame data is generated according to the number of frame data FD generated during the generation of frame data FD from the update firmware UFW, but the present disclosure is not limited thereto. That is, the padding frame data does not need to be generated during the generation of the frame data FD, and the padding frame data may be generated during the generation of the page data PD and may be combined to the randomized frame data ranFD.

In addition, in the firmware update process, the randomized frame data ranFD and the header information are encoded and written to the NAND flash memory 100, but the present disclosure is not limited thereto. That is, at least one of the randomized frame data ranFD and the header information may be written to the NAND flash memory 100 without being encoded. In addition, the frame data FD may be randomized after being encoded.

In addition, in the firmware update process, after the randomization process is performed for all the frame data FD, the page data PD is generated and written, but the present disclosure is not limited thereto. That is, for example, the page data PD may be generated and written each time the randomization process for some of frame data FD is completed.

In addition, in the firmware update process, the memory controller 200 modifies the erase count information in the header information, and then supplies the modified erase count information to the random number generation circuit 282 as a seed value, but the present disclosure is not limited thereto. That is, for example, the memory controller 200 may perform the randomization process using the erase count information before modifying the header information as a seed value, and then may modify the erase count information. In this case, during the de-randomization process in the firmware restoration process described later, the memory controller 200 performs an inverse operation of the operation performed during the modification process of the erase count information on the erase count information acquired from the header information, and supplies the inversely operated erase count information to the random number generation circuit 282 as a seed value.

Further, the memory controller 200 may perform the same processes performed in the header information modification process on the erase count information acquired before the modification, either before modifying the header information, or in parallel with modifying the header information, and may supply the processed erase count information to the random number generation circuit 282 as a seed value.

1.3.2 Firmware Restoration Process

Figure 9:
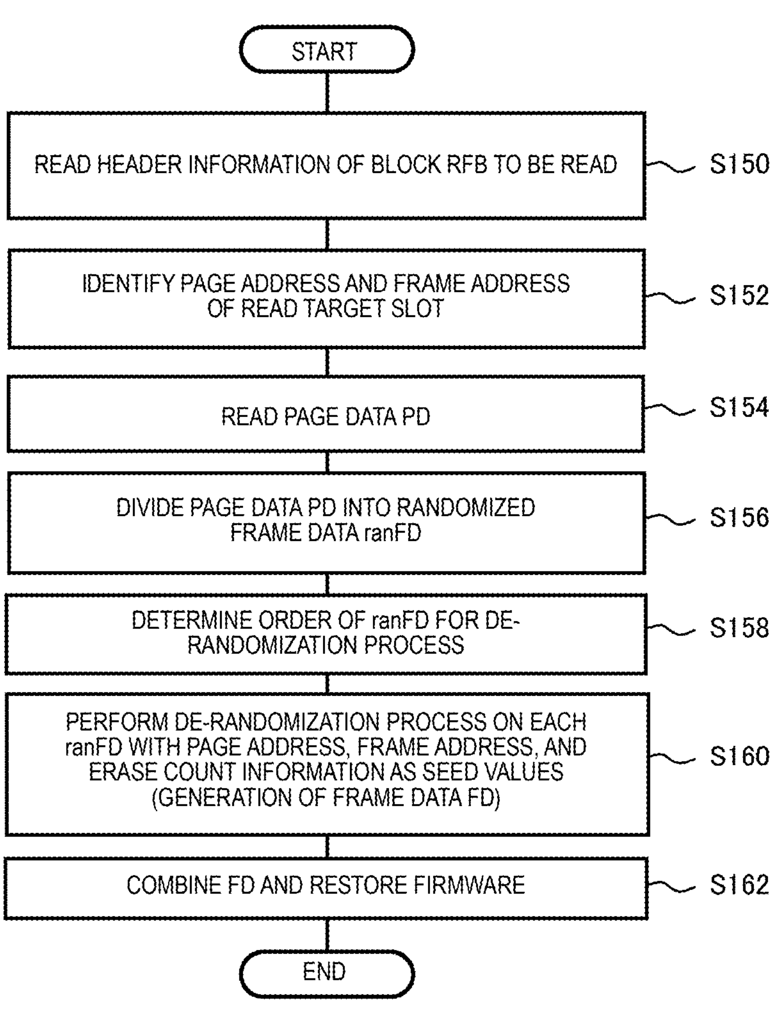
FIG. 9 shows a flow of a firmware restoration process according to the first embodiment.

Next, a firmware restoration process according to the first embodiment will be described. FIG. 9 shows a flow of firmware restoration according to the first embodiment. FIG. 9 particularly shows a flow of the process when the firmware written to the NAND flash memory 100 by the process described with reference to FIGS. 7 and 8 is restored.

When the power supply to the memory system 1 is started and the memory system 1 starts up, the memory controller 200 initiates the firmware restoration process. Specifically, the processor 260 reads the IPL from the ROM 230 and executes the IPL.

In step S150, the memory controller 200 reads the header information of the block in which the firmware to be restored is stored (hereinafter, referred to as a read target block RFB) from the NAND flash memory 100 according to the IPL. The read header information is decoded by the ECC circuit 270 and temporarily stored in, for example, the buffer memory 240.

In step S152, the memory controller 200 identifies the page address of the read target slot in the read target block RFB (hereinafter, referred to as a read target page address) and the frame address of the read target slot by referring to the slot allocation information in the read header information.

In step S154, the memory controller 200 reads the page data PD from the area corresponding to the read target page address in the NAND flash memory 100. The read page data PD is temporarily stored in, for example, the buffer memory 240.

In step S156, the memory controller 200 divides the page data PD read in step S154 and generates randomized frame data ranFD. Each randomized frame data ranFD is associated with the page address corresponding to the original page data PD and the frame address indicating a position in the original page data PD. Each randomized frame data ranFD is decoded by the ECC circuit 270.

In step S158, the memory controller 200 determines the order in which the de-randomization process is performed on the randomized frame data ranFD. The de-randomization process may be performed in parallel on a plurality of randomized frame data ranFD.

In step S160, the memory controller 200 performs the de-randomization process on the randomized frame data ranFD in the order determined in step S158, to generate frame data FD. The memory controller 200 uses the erase count information in the header information, along with the page address and the frame address associated with the randomized frame data ranFD, as seed values. The memory controller 200 may generate seed values by performing arithmetic operations and other processes on the erase count information, the page address, and/or the frame address, and may use the generated seed values for the de-randomization process.

In step S162, the memory controller 200 combines the frame data FD generated in step S160 to generate firmware FW. The firmware FW restored here corresponds to the update firmware UFW in the firmware update process.

The firmware restoration process ends.

In step S162, the memory controller 200 may combine the frame data FD excluding the padding frame data.

In the randomization process and the de-randomization process, the page address and the frame address are used as seed values in addition to the erase count information, but the present disclosure is not limited thereto. That is, only the erase count information may be used as a seed value. In addition, a value different from the page address or the frame address may be used as a seed value in addition to the erase count information.

The slot allocation information may be included in the update program UDP or the IPL. In this case, the memory controller 200 may perform various operations by referring to the slot allocation information in the update program UDP during the firmware update process, and may perform various operations by referring to the slot allocation information in the IPL during the firmware restoration process.

1.4 Effects

The memory system according to the first embodiment has the following effects.

In the related memory systems, the randomization process and the de-randomization process of firmware are performed using the seed values in the IPL. Since the IPL is stored in the ROM, it is not easy to modify the seed values. Therefore, in such memory systems, fixed values are used as seed values during the randomization process and the de-randomization process on the firmware.

In the first embodiment, since the value stored in the NAND flash memory is used as the seed value, it is easy to modify the seed value.

In the first embodiment, the erase count information of the write destination block or the read target block is used as a seed value. Since the erase count information is modified each time an erase operation is performed on the block, the seed value used for the randomization process performed on the data to be written can be changed before and after the erase operation.

As described above, the memory system according to the first embodiment can prevent the same value from being programmed into the same memory cell of the NAND flash memory repeatedly, and can prevent the decrease in reliability of the NAND flash memory.

In addition, in the first embodiment, the erase count information of the storage destination block of the firmware is written to the storage destination block. As a result, it is not necessary to provide a block for storing the erase count information of the firmware block group separately from the firmware block, and thus the required number of blocks can be reduced.

In addition, in the first embodiment, during the firmware update process, it is sufficient to rewrite only the storage destination block of the update firmware. As a result, the processing time and the number of erase operations during updating the firmware can be reduced.

1.5 Modification Example

Next, a modification example of the first embodiment will be described. In the firmware update process according to the modification example of the first embodiment, the memory controller 200 refers to a table to associate the block address of each block with the erase count information performed on the block (hereinafter, referred to as a block table BT) when modifying the erase count information in the header information.

The block table BT is a table for managing a correspondence between the block address of a block in the memory cell array 110 and the erase count information of the block. The block table BT is stored in the NAND flash memory 100. The block table BT, for example, is read from the NAND flash memory 100 and temporarily stored in the RAM 220 at the startup of the memory system. The block table BT stored in the RAM 220 is updated, for example, each time an erase operation is performed on any block in the memory cell array 110. However, the block table BT stored in the NAND flash memory 100 in a non-volatile manner does not necessarily need to be updated each time the block table BT stored in the RAM 220 is updated.

Figure 10:
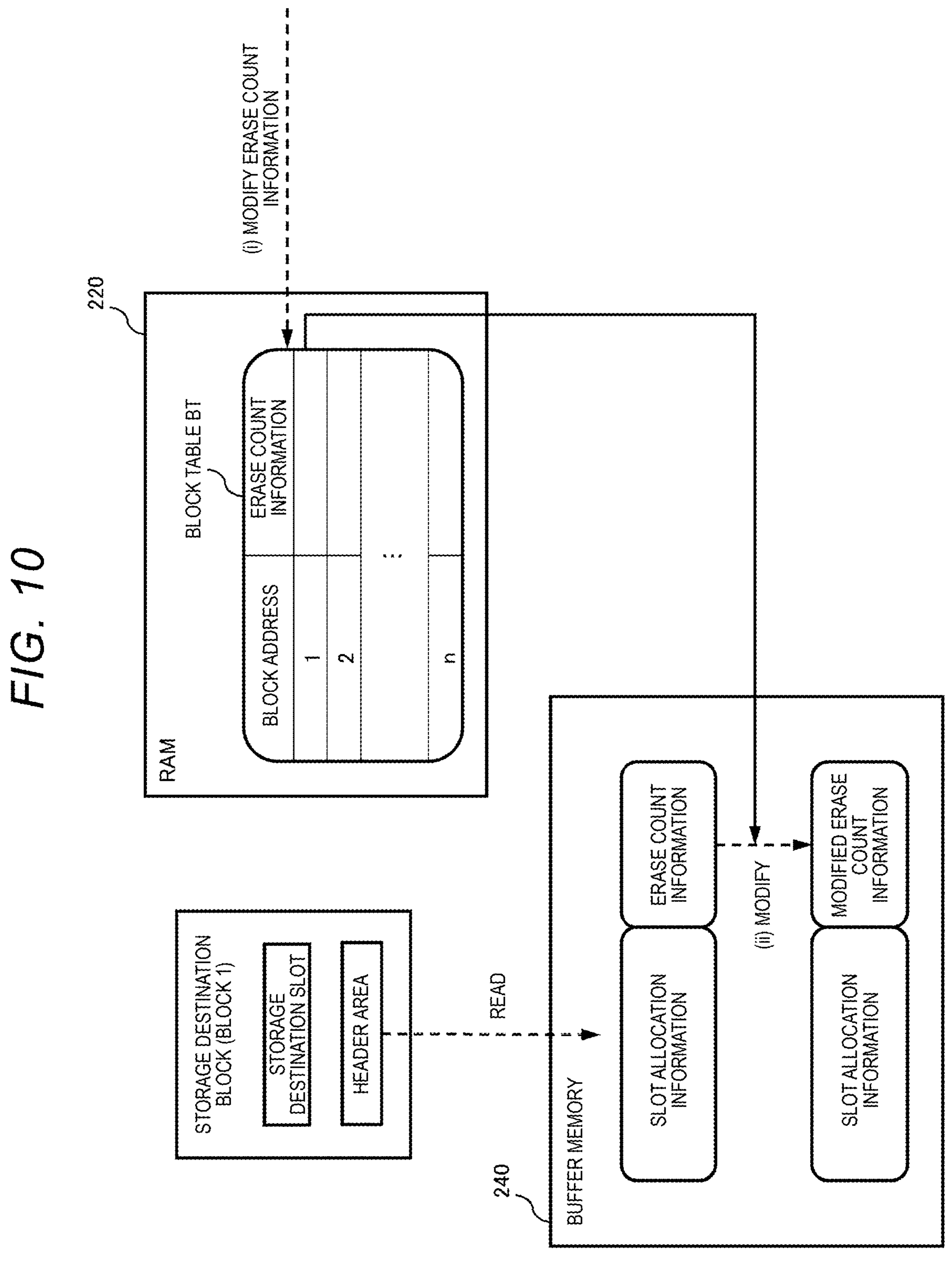
FIG. 10 shows an outline of a header information modification process according to a modification example of the first embodiment.

With reference to FIG. 10, an outline of a header information modification process according to a modification example of the first embodiment will be described. FIG. 10 shows an outline of a header information modification process according to a modification example of the first embodiment. In FIG. 10, the solid line arrows indicate the flow of data, and the dashed line arrows indicate the process by the memory controller 200.

The data management unit 266 modifies the erase count information in the block table BT associated with the block address of the storage destination block, in response to the erase operation being performed on the storage destination block ((i) of FIG. 10). Specifically, the data management unit 266 increments the erase count information by 1. In FIG. 10, the erase count information associated with the block address 1 in the block table BT is modified in response to the erase operation being performed on the block 1 which is the storage destination block.

The data management unit 266 refers to the block table BT and modifies the header information (particularly, the erase count information) read to the buffer memory 240 ((ii) of FIG. 10). Specifically, the data management unit 266, for example, modifies the erase count information in the header information to the erase count information corresponding to the block address of the storage destination block in the block table BT. Alternatively, the data management unit 266 may perform arithmetic operations and other processes on the erase count information acquired from the block table BT, and may modify the erase count information in the header information to the processed value.

The above is an outline of the header information modification process according to the modification example of the first embodiment. The memory system according to the present modification example has the same effects as the effects of the memory system according to the first embodiment. In addition, in the present modification example, the arithmetic operations and other processes for modifying the erase count information can be performed before reading header information. As a result, the update processing time can be reduced. The header information modification process, which involves the referencing of the block table BT described in the present modification example, can be applied not only to the first embodiment but also to other embodiments.

2. Second Embodiment

Next, a memory system according to a second embodiment will be described. In the first embodiment, in the firmware randomization process, information on the erase count of the storage destination block is used as a seed value. In the second embodiment, in the firmware randomization process, information on the total erase count of a plurality of blocks including the storage destination block is used as a seed value. In the following, an example will be described in which information on the total value of the erase count of all the firmware blocks included in the memory cell array 110 (hereinafter, referred to as total erase count information) is used. In addition, in the following, the description of the configuration and operation equivalent to the first embodiment may be omitted.

2.1 Internal Configuration of Firmware Block

Figure 11:
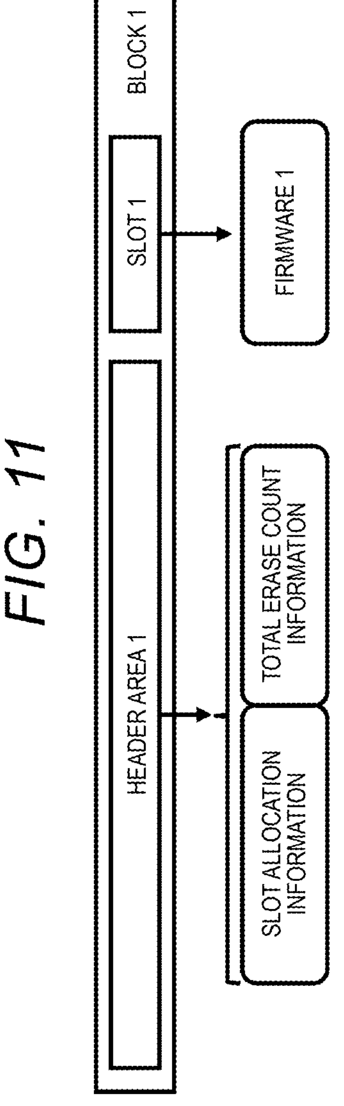
FIG. 11 shows an internal configuration of a firmware block according to a second embodiment.

First, an internal configuration of the firmware block according to the second embodiment will be described. FIG. 11 shows an internal configuration of the firmware block according to the second embodiment. As shown in FIG. 11, the header information includes, for example, slot allocation information and total erase count information. The total erase count information is updated, for example, each time an erase operation is performed on the block, by referring to the total erase count information provided in the header information of all the firmware blocks. The total erase count information, for example, is set to "0" at the time of shipment of the memory system 1.

2.2 Firmware Update Process

Next, an outline of a firmware update process according to the second embodiment will be described. Since an example of data processing for the firmware update process by the memory controller 200 according to the second embodiment is the same as the first embodiment (for example, the example described with reference to FIG. 6), the description thereof will be omitted. FIG. 12 shows an outline of reading header information, a header information modification process, and a seed value setting process in the firmware update process according to the second embodiment. FIG. 12 particularly shows an example in which the memory cell array 110 includes three firmware blocks (blocks 1 to 3). Since the process not shown in FIG. 12 is equivalent to the process described in the first embodiment, the description thereof will be omitted. In FIG. 12, the solid line arrows indicate the flow of data, and the dashed line arrows indicate the process by the memory controller 200.

When the update process is initiated, the block control unit 262 reads the header information of all the firmware blocks ((i) of FIG. 12). Hereinafter, the information read from the block x, which is the firmware block, may be suffixed with "x". In FIG. 12, header information 1 to 3 is read from the header areas of blocks 1 to 3. The read header information is decoded by the ECC circuit 270 and temporarily stored in, for example, the buffer memory 240.

The data management unit 266 modifies the header information read from the storage destination block FSB of the update firmware ((ii) of FIG. 12). Hereinafter, the header information read from the storage destination block FSB and the information in the header information may be prefixed with "FSB" to be distinguished from the other header information and the information in the other header information. In FIG. 12, the storage destination block FSB is the block 1, and the header information 1, which is the FSB header information, is modified.

The data management unit 266 particularly modifies the FSB total erase count information provided in the FSB header information. In this modification process, the data management unit 266 refers to all the total erase count information provided in all the read header information (including the FSB header information). Specifically, the data management unit 266 modifies, for example, the FSB total erase count information to a value obtained by adding 1 to the maximum value of the total erase count information. That is, the data management unit 266 sets the FSB total erase count information=Max ([all the total erase count information])+1. However, the difference between the maximum value and the modified value of the FSB total erase count information is not limited to 1, and it is sufficient that the value at least increases. In FIG. 12, examples of values of each total erase count information are shown in parentheses. That is, in FIG. 12, "total erase count information 1" is 2, "total erase count information 2" is 5, and "total erase count information 3" is 4. In this case, since the maximum value of the total erase count information is 5, the FSB total erase count information (total erase count information 1) is modified to 6 (=5+1).

During the frame data FD randomization process, the seed value setting unit 264 refers to the modified FSB header information and supplies the FSB total erase count information to the random number generation circuit 282 as a seed value ((iii) of FIG. 12). In addition, the seed value setting unit 264 supplies the page address and the frame address associated with each frame data FD to the random number generation circuit 282 as seed values ((iii) of FIG. 12).

The block control unit 262 writes the modified FSB header information to the header area of the storage destination block FSB ((iv) of FIG. 12). In FIG. 12, the modified header information 1, which is the modified FSB header information, is written to the header area 1 of the block 1.

The above is an outline of the firmware update process according to the second embodiment. As described above, in the firmware update process according to the second embodiment, the memory controller 200 refers to the total erase count information in the header information of all the firmware blocks, and modifies the total erase count information in the header information of the storage destination block. Further, the memory controller 200 performs the randomization process on the update firmware using the modified total erase count information as a seed value. That is, in the firmware randomization process, a different seed value is used for each firmware update process (or erase operation of any firmware block).

Figure 13:
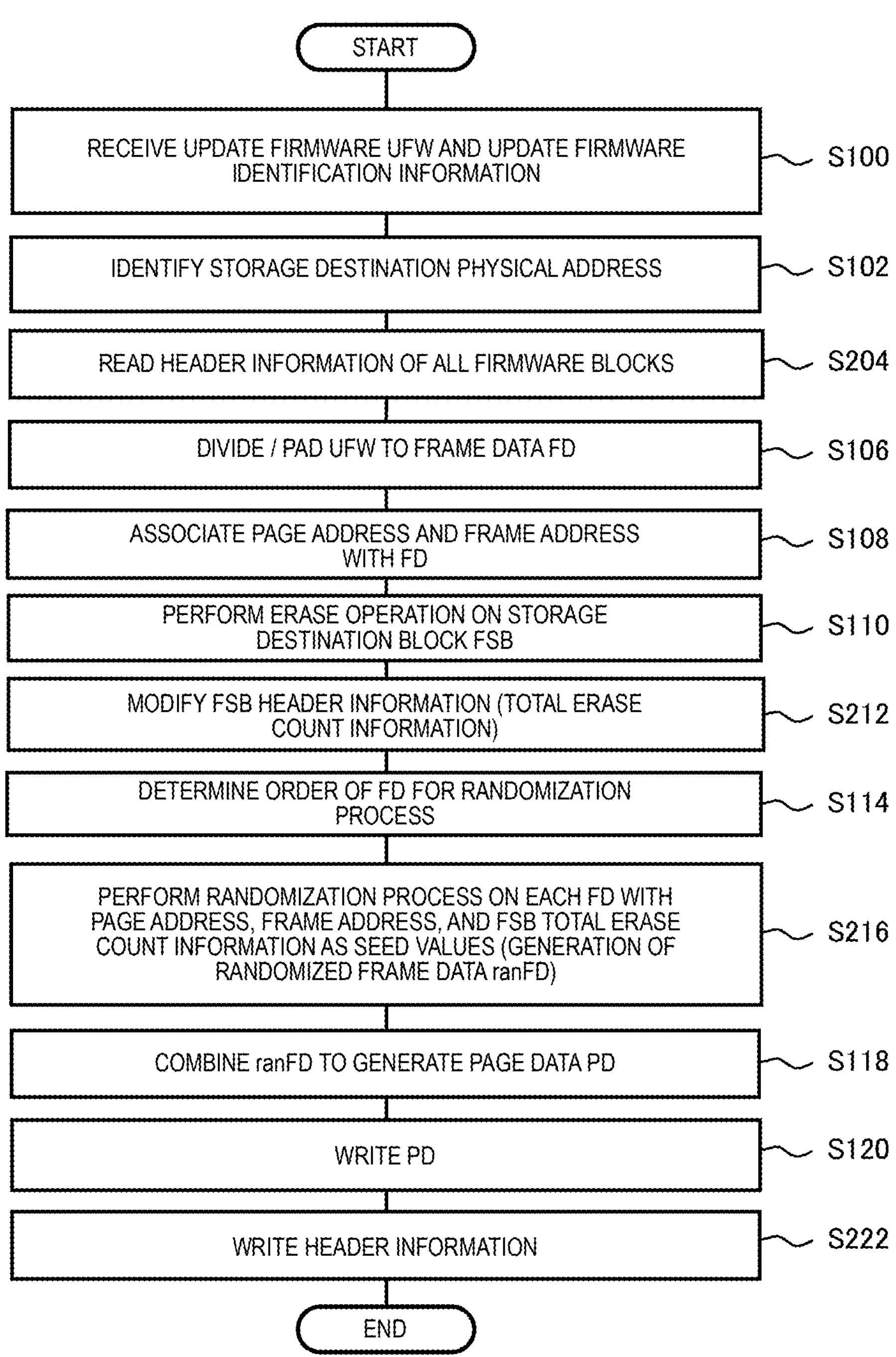
FIG. 13 shows a flow of a firmware update process according to the second embodiment.

Next, a flow of the firmware update process according to the second embodiment will be described with reference to FIG. 13. FIG. 13 particularly shows a flow when the process as described with reference to FIGS. 6 and 12 is performed. For the steps having the same step numbers as the steps in the first embodiment (FIG. 8) in FIG. 13, equivalent processes to the processes described in the first embodiment are performed. The description of these steps is omitted. In the following, the reading of the header information (step S204), the header information modification process (step S212), the frame data FD randomization process (step S216), and the writing of the header information (step S222) will be described.

In step S204, the memory controller 200 reads the header information of all the firmware blocks. The read header information is decoded by the ECC circuit 270. The memory controller 200 may read only the total erase count information in the header information other than in the FSB header information instead of reading entire header information other than the FSB header information. Alternatively, the memory controller may, after reading and decoding the header information in the header information other than in the FSB header information, store only the total erase count information in the buffer memory 240 instead of storing the entire header information other than the FSB header information.

In step S212, the memory controller 200 refers to all the header information read in step S204, and modifies the FSB header information (particularly, the FSB total erase count information) stored in the buffer memory 240.

In step S216, the memory controller 200 performs the randomization process on the frame data FD in the order determined in step S114, to generate randomized frame data ranFD. The memory controller 200 uses the modified FSB total erase count information, along with the page address and the frame address associated with the frame data FD, as seed values. The generated randomized frame data ranFD is associated with the page address and the frame address associated with the original frame data FD. The memory controller 200 may generate seed values by performing arithmetic operations and other processes on the FSB total erase count information, the page address, and/or the frame address, and may use the generated seed values for the randomization process. The randomized frame data ranFD is encoded by the ECC circuit 270.

In step S222, the memory controller 200 writes the modified FSB header information to the NAND flash memory 100. The modified FSB header information is encoded by the ECC circuit 270 and is written to the header area of the storage destination block FSB.

2.3 Firmware Restoration Process

Figure 14:
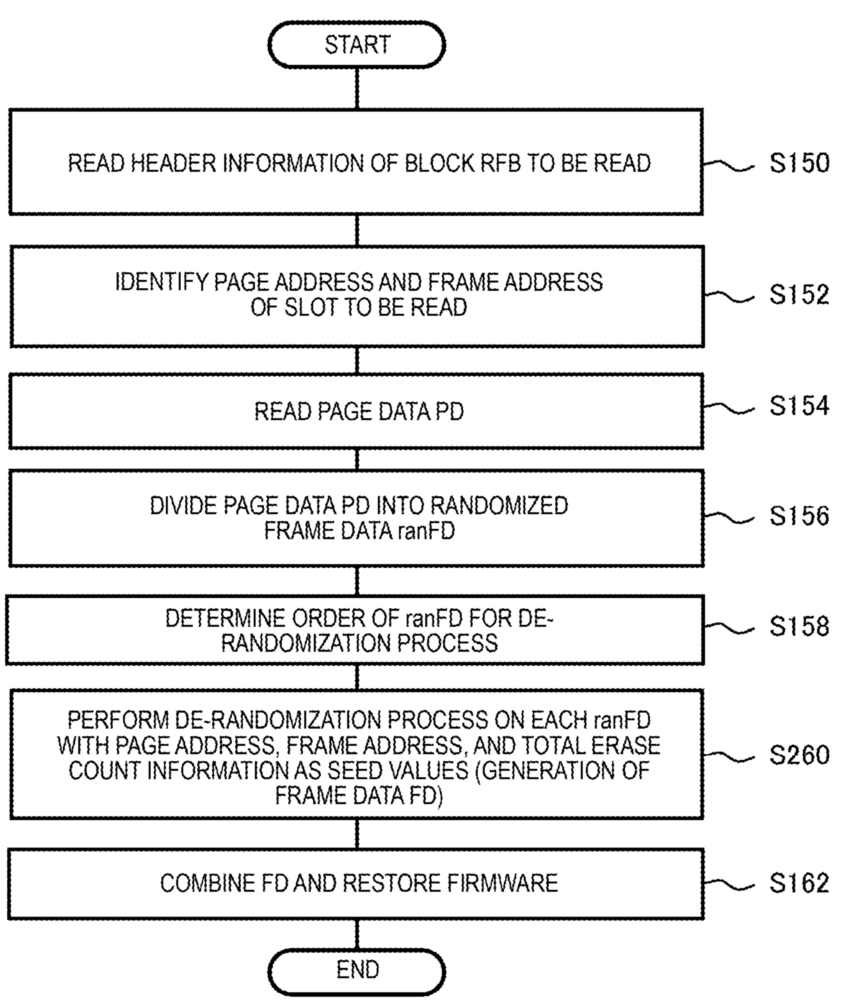
FIG. 14 shows a flow of a firmware restoration process according to the second embodiment.

Next, a firmware restoration process according to the second embodiment will be described with reference to FIG. 14. FIG. 14 shows a flow of a firmware restoration process according to the second embodiment. FIG. 14 particularly shows a flow of a process when the firmware written to the NAND flash memory 100 by the process described with reference to FIGS. 12 and 13 is restored. For the steps having the same step numbers as the steps in the first embodiment (FIG. 9) in FIG. 14, equivalent processes to the processes described in the first embodiment are performed. The description of these steps is omitted. In the following, the de-randomization process (step S260) of the randomized frame data ranFD will be described.

In step S260, the memory controller 200 performs the de-randomization process on the randomized frame data ranFD in the order determined in step S158, to generate frame data FD. The memory controller 200 uses the total erase count information in the header information, along with the page address and the frame address associated with the randomized frame data ranFD, as seed values. The memory controller 200 may generate seed values by performing arithmetic operations and other processes on the total erase count information, the page address, and/or the frame address, and may use the generated seed values for the de-randomization process.

In the second embodiment, the example has been described in which information on the total value of the erase count of all the firmware blocks is used as the seed value, but the present disclosure is not limited thereto. That is, for example, all the firmware blocks may be divided into a plurality of groups, and the total erase count information for each group to which the firmware block belongs may be used as a seed value. In this case, the memory system 1 stores information indicating to which group each firmware block belongs as a part of the header information, or manages a table that associate a block address of a block with a group to which the block belongs.

2.4 Effects

The memory system according to the second embodiment has the same effects as the effects of the memory system according to the first embodiment. In addition, the memory system according to the second embodiment has the following effects as described below.

In the second embodiment, during the firmware update process, information on the total erase count of the plurality of blocks including the write destination block is used as a seed value. That is, the value of the seed value used during the firmware update process also changes by the erase operation performed on blocks other than the storage destination block. Therefore, it is possible to change the seed value used for the randomization process performed on the data to be written before and after the erase operation in bigger increments.

3. Third Embodiment

Next, a memory system according to a third embodiment will be described. In the first embodiment, in the firmware randomization process, information on the erase count of the storage destination block is used as a seed value. In the third embodiment, in the firmware randomization process, information on the timing when the erase operation is performed on the storage destination block is used as a seed value. In the following, the description of the configuration and operation equivalent to the first embodiment may be omitted.

3.1 Configuration 3.1.1 Internal Configuration of Firmware Block

Figure 15:
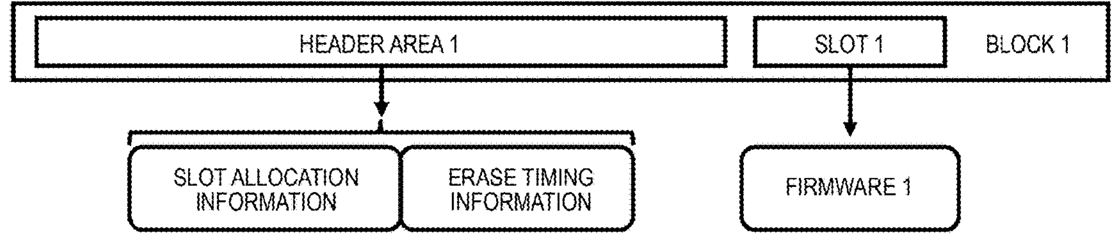
FIG. 15 shows an internal configuration of a firmware block according to a third embodiment.

First, an internal configuration of the firmware block according to the third embodiment will be described. FIG. 15 shows an internal configuration of the firmware block according to the third embodiment. As shown in FIG. 15, the header information includes, for example, slot allocation information and information on the timing when the erase is performed on the block (hereinafter, referred to as erase timing information). The erase timing information is modified, for example, each time an erase operation is performed on the block.

3.1.2 Configuration of Memory Controller

Figure 16:
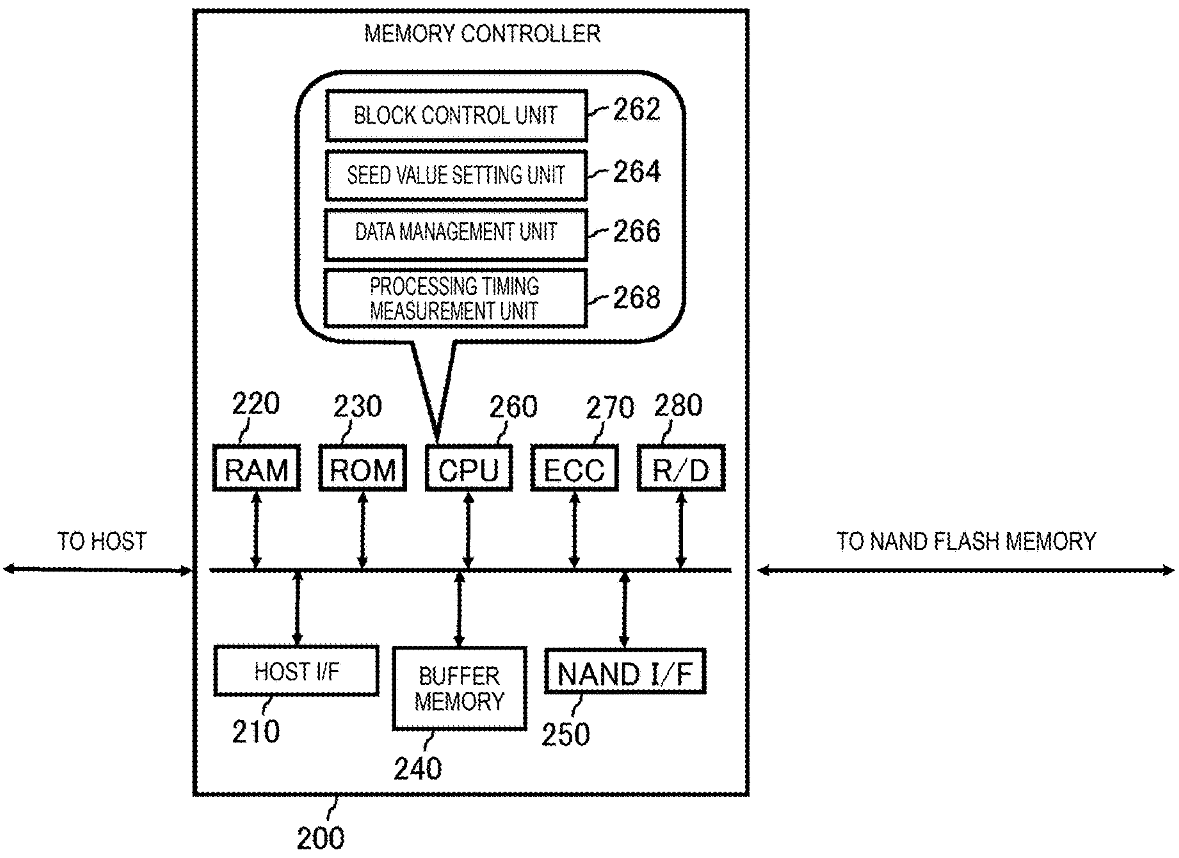
FIG. 16 shows a configuration of a memory controller according to the third embodiment.

Next, a configuration of the memory controller according to the third embodiment will be described with reference to FIG. 16. The description of the configuration equivalent to the first embodiment is omitted. In the following, the configuration of the processor 260 will be described.

The processor 260 functions as, for example, a block control unit 262, a seed value setting unit 264, a data management unit 266, and processing timing measurement unit 268. The processor 260 functions as each of these units, for example, by executing the firmware.

The processing timing measurement unit 268 includes, for example, a timer, and outputs the time at that time point as processing timing information each time specific processing is performed. Specifically, for example, each time an erase operation is performed on any block in the NAND flash memory 100, the processing timing measurement unit 268 supplies the time to the data management unit 266 as erase timing information. Alternatively, the processing timing measurement unit 268 may output the time as erase timing information in response to the memory controller 200 receiving a signal indicating that erase of data in the block has been completed from the NAND flash memory 100.

3.2 Firmware Update Process

Next, an outline of a firmware update process according to the third embodiment will be described. Since an example of data processing for the firmware update process by the memory controller 200 according to the third embodiment is the same as the example of the first embodiment (for example, the example described with reference to FIG. 6), the description thereof will be omitted. FIG. 17 shows an outline of a header information modification process and a seed value setting process in the firmware update process according to the third embodiment. Since the process not shown in FIG. 17 is equivalent to the process in the first embodiment, the description thereof will be omitted. In FIG. 17, the solid line arrows indicate the flow of data, and the dashed line arrows and squares indicate the process by the memory controller 200.

When the update process is initiated, the block control unit 262 reads the header information from the header area of the storage destination block FSB. The read header information is decoded by the ECC circuit 270 and temporarily stored in, for example, the buffer memory 240.

The block control unit 262 performs an erase operation on the storage destination block FSB.

The processing timing measurement unit 268 supplies erase timing information to the data management unit 266, in response to the block control unit 262 performing the erase operation ((i) of FIG. 17).

The data management unit 266 modifies the read header information (particularly, the erase timing information) ((ii) of FIG. 17). At this time, the data management unit 266 refers to the erase timing information supplied from the processing timing measurement unit 268. Specifically, the data management unit 266 modifies, for example, the erase timing information in the header information to the value of the erase timing information supplied from the processing timing measurement unit 268. Alternatively, the data management unit 266 may perform arithmetic operations and other processes on the supplied erase timing information, and may modify the erase timing information in the header information to the processed value.

During the frame data FD randomization process, the seed value setting unit 264 refers to the modified header information and supplies the erase timing information to the random number generation circuit 282 as a seed value ((iii) of FIG. 17). In addition, the seed value setting unit 264 supplies the page address and the frame address associated with each frame data FD to the random number generation circuit 282 as seed values ((iii) of FIG. 17).

The above is an outline of the firmware update process according to the third embodiment. As described above, in the firmware update process according to the third embodiment, the memory controller 200 modifies the erase timing information in the header information by referring to the time at which the block control unit 262 performs the erase operation on the storage destination block. The memory controller 200 performs randomization process on the update firmware using the modified erase timing information as a seed value. That is, in the firmware randomization process, a different seed value is used according to the erase timing of the storage destination block.

Figure 18:
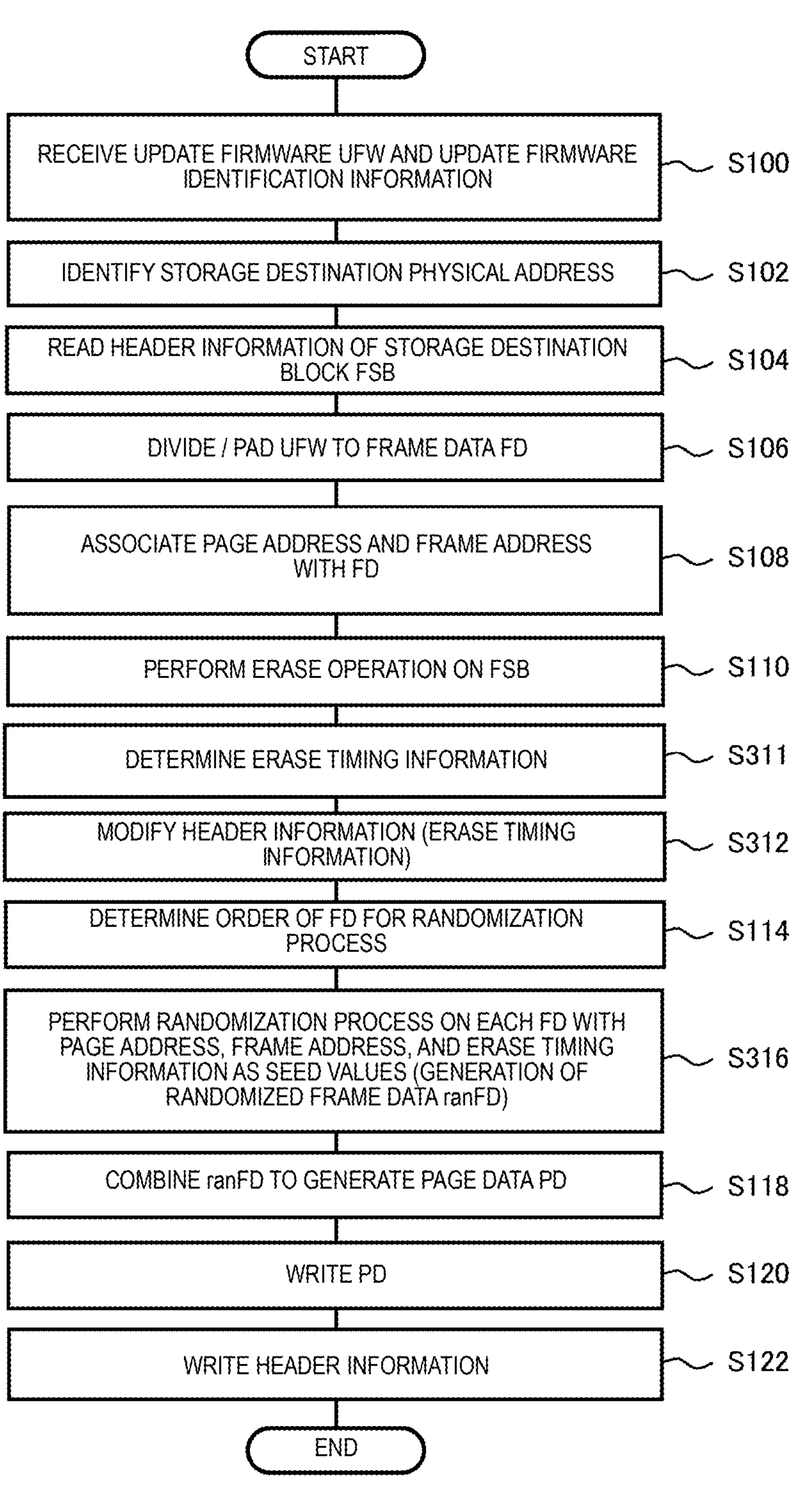
FIG. 18 shows a flow of a firmware update process according to the third embodiment.

Next, a flow of the firmware update process according to the third embodiment will be described with reference to FIG. 18. FIG. 18 particularly shows a flow when the process as described with reference to FIGS. 6 and 17 is performed. For the steps having the same step numbers as the steps in the first embodiment (FIG. 8) in FIG. 18, equivalent processes to the processes described in the first embodiment are performed. The description of these steps is omitted. In the following, the erase timing information determination process (step S311), the header information modification process (step S312), and the frame data FD randomization process (step S316) will be described.

In step S311, the memory controller 200 (particularly, the processing timing measurement unit 268) determines the erase timing information, in response to the erase operation being performed on the storage destination block FSB.

In step S312, the memory controller 200 refers to the erase timing information determined in step S311, and modifies the header information (particularly, the erase timing information) stored in the buffer memory 240.

In step S316, the memory controller 200 performs the randomization process on the frame data FD in the order determined in step S114, to generate randomized frame data ranFD. The memory controller 200 uses the modified erase timing information, along with the page address and the frame address associated with the frame data FD, as seed values. The generated randomized frame data ranFD is associated with the page address and the frame address associated with the original frame data FD. The memory controller 200 may generate seed values by performing arithmetic operations and other processes on the erase timing information, the page address, and/or the frame address, and may use the generated seed values for the randomization process. The randomized frame data ranFD is encoded by the ECC circuit 270.

3.3 Firmware Restoration Process

Figure 19:
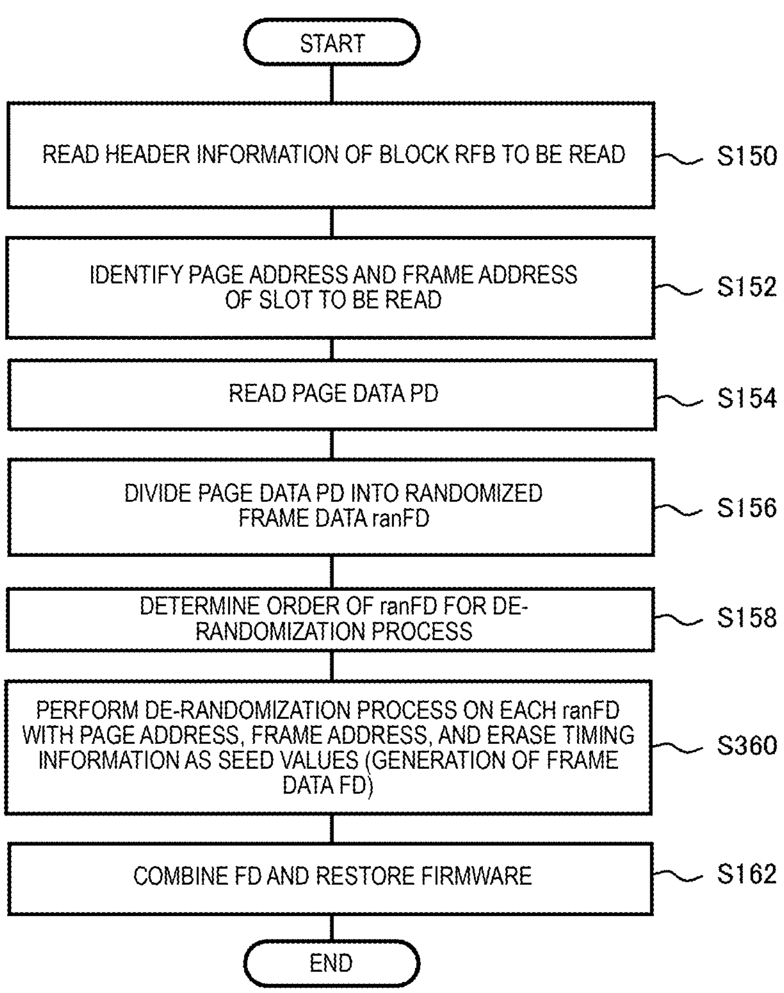
FIG. 19 shows a flow of a firmware restoration process according to the third embodiment.

Next, a firmware restoration process according to the third embodiment will be described with reference to FIG. 19. FIG. 19 shows a flow of a firmware restoration process according to the third embodiment. FIG. 19 particularly shows a flow of the process when the firmware written to the NAND flash memory 100 by the process described with reference to FIGS. 17 and 18 is restored. For the steps having the same step numbers as the steps in the first embodiment (FIG. 9) in FIG. 19, equivalent processes to the processes described in the first embodiment are performed. The description of these steps is omitted. In the following, the de-randomization process (step S360) of the randomized frame data ranFD will be described.

In step S360, the memory controller 200 performs the de-randomization process on the randomized frame data ranFD in the order determined in step S158, to generate frame data FD. The memory controller 200 uses the erase timing information in the header information, along with the page address and the frame address associated with the randomized frame data ranFD, as seed values. The memory controller 200 may generate seed values by performing arithmetic operations and other processes on the erase timing information, the page address, and/or the frame address, and may use the generated seed values for the de-randomization process.

As the erase timing information, for example, the energization time of the memory controller 200 at the time when the erase operation is performed may be used. When using the energization time as the erase timing information, the processing timing measurement unit 268 includes a timer, measures the energization time each time an erase operation is performed, and outputs the energization time as the erase timing information. Further, it is also possible to use information other than time and energization time as the erase timing information.

3.4 Effects

The memory system according to the third embodiment has the same effects as the effects of the memory system according to the first embodiment. In addition, the memory system according to the third embodiment has the following effects as described below.

In the third embodiment, information on the timing when the erase operation is performed on the storage destination block is used as a seed value. The erase timing information varies, for example, depending on the time at which the erase operation is performed. As a result, it is possible to impart randomness to the seed value without performing random number generation or the like for generating the seed value.

4. Fourth Embodiment

Next, a memory system according to a fourth embodiment will be described. In the first embodiment, in the firmware randomization process, information on the erase count of the storage destination block is used as a seed value. In the fourth embodiment, in the firmware randomization process, information on the firmware is used as a seed value. Information on the firmware varies for each reception of the update firmware. In the following, particularly, an example will be described in which information on the firmware version is used as a seed value. In the following, the description of the configuration and operation equivalent to the first embodiment may be omitted.

4.1 Internal Configuration of Firmware Block

Figure 20:
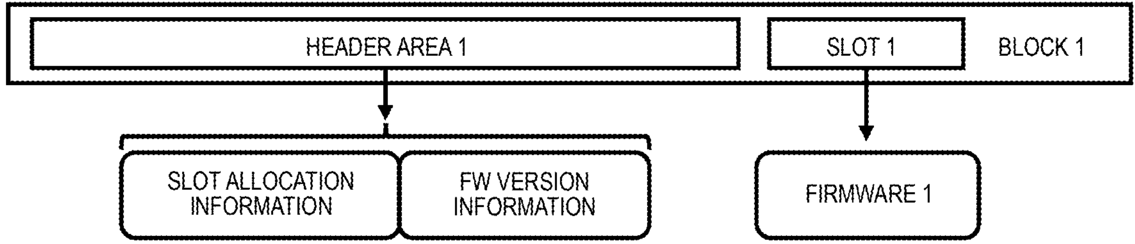
FIG. 20 shows an internal configuration of a firmware block according to a fourth embodiment.

First, an internal configuration of the firmware block according to the fourth embodiment will be described. FIG. 20 shows an internal configuration of the firmware block according to the fourth embodiment. As shown in FIG. 20, the header information includes, for example, slot allocation information and information on the firmware version stored in a block (hereinafter, referred to as FW version information). The FW version information is updated, for example, each time firmware update process is performed. The FW version information, for example, is set to "1" at the time of shipment of the memory system 1.

4.2 Firmware Update Process

Next, an outline of a firmware update process according to the fourth embodiment will be described. Since an example of data processing for the firmware update process by the memory controller 200 according to the fourth embodiment is the same as the example of the first embodiment (for example, the example described with reference to FIG. 6), the description thereof will be omitted. FIG. 21 shows an outline of a header information modification process and a seed value setting process in the firmware update process according to the fourth embodiment. Since the process not shown in FIG. 21 is equivalent to the process in the first embodiment, the description thereof will be omitted. In FIG. 21, the solid line arrows indicate the flow of data, and the dashed line arrows indicate the process by the memory controller 200. In FIG. 21, two buffer memories 240 are shown, but this is for convenience only and does not mean that two buffer memories 240 need to be provided.

When the update process is initiated, the block control unit 262 reads the header information from the header area of the storage destination block FSB. The read header information is decoded by the ECC circuit 270 and temporarily stored in, for example, the buffer memory 240.

The data management unit 266 modifies the read header information (particularly, the FW version information) ((i) of FIG. 21). At this time, the data management unit 266 refers to the update firmware identification information received from the host. Specifically, the data management unit 266 modifies, for example, the FW version information in the header information to a value of the version information of the update firmware provided in the update firmware identification information. Alternatively, the data management unit 266 may perform arithmetic operations and other processes on the acquired update firmware version information, and may modify the FW version information in the header information to the processed value.

During the frame data FD randomization process, the seed value setting unit 264 refers to the modified header information and supplies the FW version information to the random number generation circuit 282 as a seed value ((ii) of FIG. 21). In addition, the seed value setting unit 264 supplies the page address and the frame address associated with each frame data FD to the random number generation circuit 282 as seed values ((ii) of FIG. 21).

The above is an outline of the firmware update process according to the fourth embodiment. As described above, in the firmware update process according to the fourth embodiment, the memory controller 200 modifies the FW version information in the header information, and performs the randomization process on the update firmware using the modified FW version information as a seed value. That is, in the firmware randomization process, a different seed value is used each time a firmware update process is performed.

Figure 22:
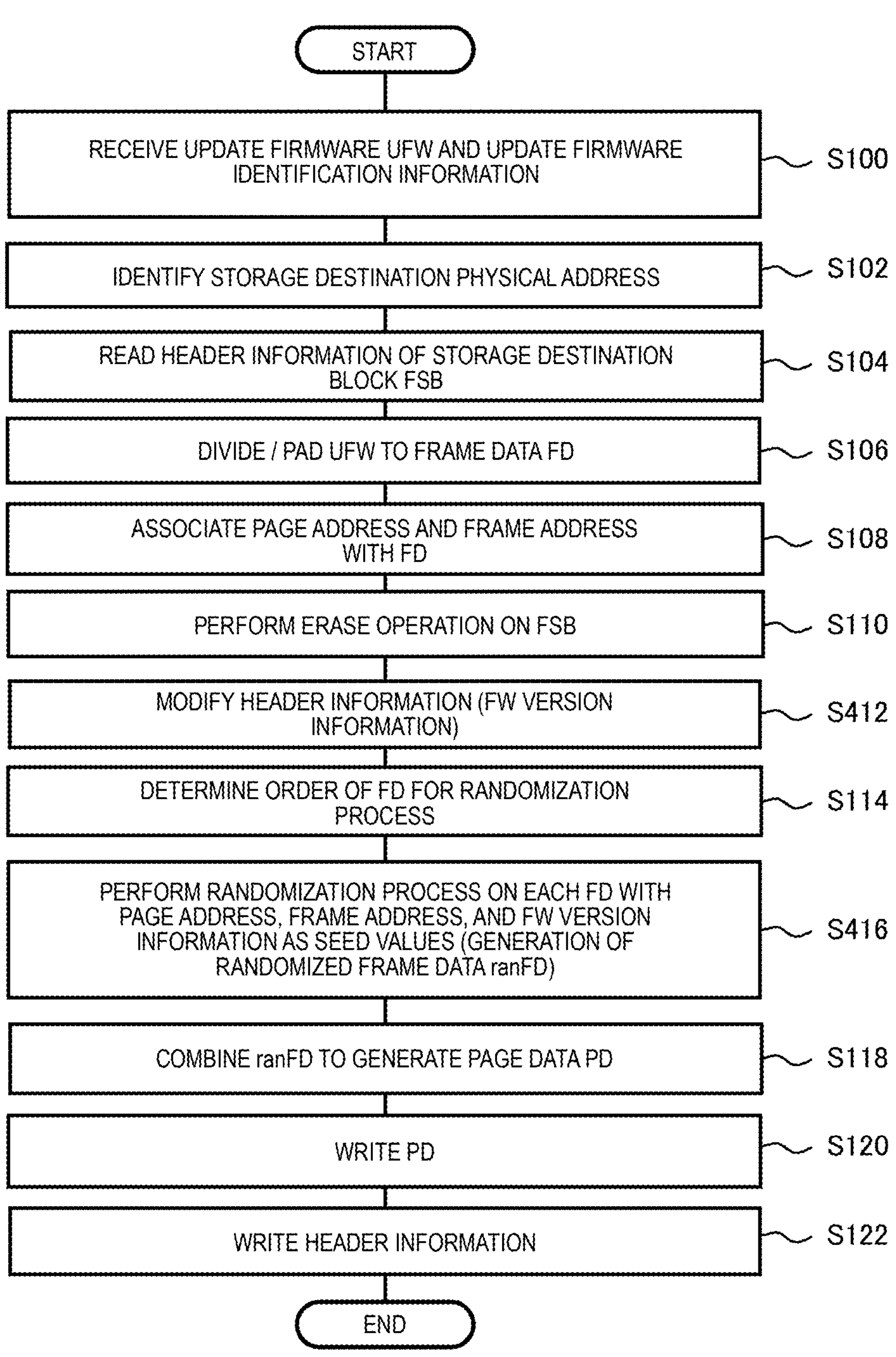
FIG. 22 shows a flow of a firmware update process according to the fourth embodiment.

Next, a flow of the firmware update process according to the fourth embodiment will be described with reference to FIG. 22. FIG. 22 particularly shows a flow when the process as described with reference to FIGS. 6 and 21 is performed. For the steps having the same step numbers as the steps in the first embodiment (FIG. 8) in FIG. 22, equivalent processes to the processes described in the first embodiment are performed. The description of these steps is omitted. In the following, the header information modification process (step S412) and the frame data FD randomization process (step S416) will be described.

In step S412, the memory controller 200 refers to the update firmware identification information received from the host and modifies the header information (particularly, the FW version information) stored in the buffer memory 240.

In step S416, the memory controller 200 performs the randomization process on the frame data FD in the order determined in step S114, to generate randomized frame data ranFD. The memory controller 200 uses the modified FW version information, along with the page address and the frame address associated with the frame data FD, as seed values. The generated randomized frame data ranFD is associated with the page address and the frame address associated with the original frame data FD. The memory controller 200 may generate seed values by performing arithmetic operations and/or other processes on the FW version information, the page address, and/or the frame address, and may use the generated seed values for the randomization process. The randomized frame data ranFD is encoded by the ECC circuit 270.

4.3 Firmware Restoration Process

Figure 23:
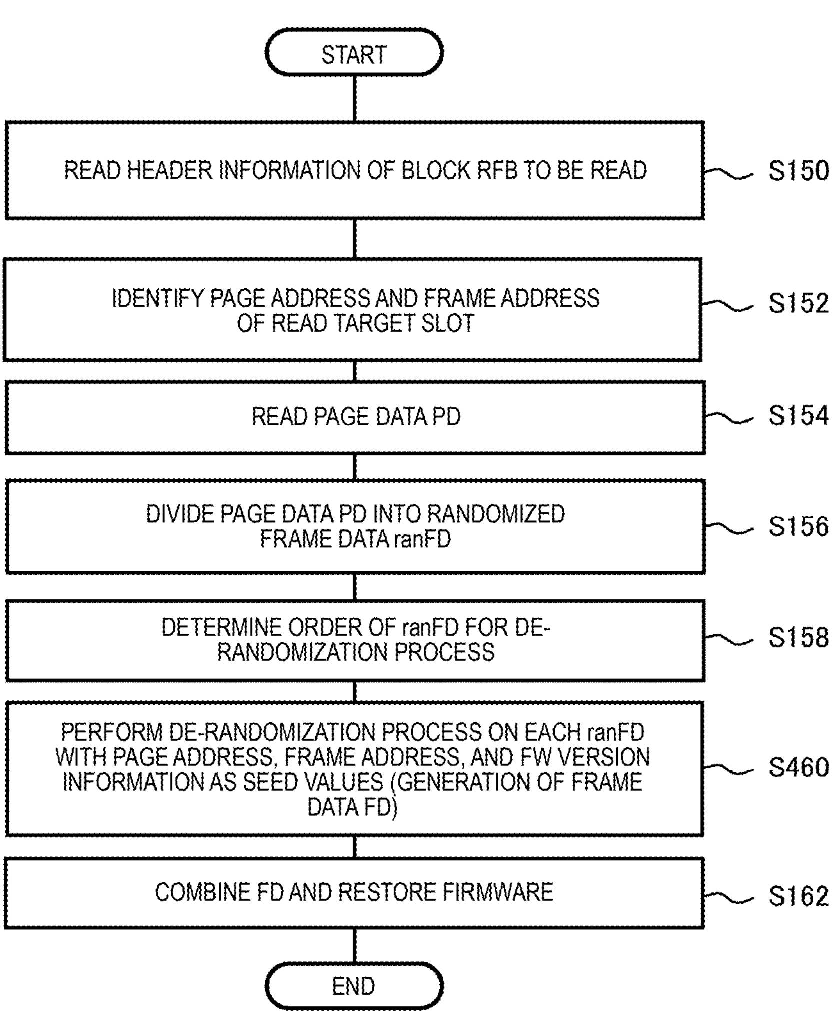
FIG. 23 shows a flow of a firmware restoration process according to the fourth embodiment.

Next, a firmware restoration process according to the fourth embodiment will be described with reference to FIG. 23. FIG. 23 shows a flow of a firmware restoration process according to the fourth embodiment. FIG. 23 particularly shows a flow of the process when the firmware written to the NAND flash memory 100 by the process described with reference to FIGS. 21 and 22 is restored. For the steps having the same step numbers as the steps in the first embodiment (FIG. 9) in FIG. 23, equivalent processes to the processes described in the first embodiment are performed. The description of these steps is omitted. In the following, the de-randomization process (step S460) of the randomized frame data ranFD will be described.

In step S460, the memory controller 200 performs the de-randomization process on the randomized frame data ranFD in the order determined in step S158, to generate frame data FD. The memory controller 200 uses the FW version information in the header information, along with the page address and the frame address associated with the randomized frame data ranFD, as seed values. The memory controller 200 may generate seed values by performing arithmetic operations and/or other processes on the FW version information, the page address, and/or the frame address, and may use the generated seed values for the de-randomization process.

4.4 Effects

The memory system according to the fourth embodiment has the same effects as the effects of the memory system according to the first embodiment. In addition, the memory system according to the fourth embodiment has the following effects as described below.

In the fourth embodiment, information on the firmware version is used as a seed value. Since the FW version information is modified each time firmware is updated, it is possible to change the seed value used for the randomization process performed on the data to be written before and after the erase operation in the firmware update process.

In the fourth embodiment, the case of using the FW version information as a seed value has been described as an example of the information on the target firmware, but the present disclosure is not limited thereto. That is, for example, the memory controller 200 may refer to other information in the update firmware identification information or at least a part of the update firmware to use as a seed value. Alternatively, the memory controller 200 may use the firmware update count or the timing of firmware update as a seed value. It is possible to implement the randomization process using the firmware update count as a seed value by a configuration analogous to the configuration described in the first embodiment, for example. Further, it is possible to implement the randomization process using the update timing of the firmware as a seed value by a configuration analogous to the configuration described in the third embodiment, for example.

5. Fifth Embodiment

Next, a memory system according to a fifth embodiment will be described. In the memory system according to the embodiment described above, one slot for storing the firmware is provided in one firmware block. In the memory system according to the fifth embodiment, a plurality of slots are provided in one firmware block. In the following, an example will be described in which the erase count information of the storage destination block is used as a seed value during the firmware randomization process in such a memory system, in contrast to the first embodiment. In addition, in the following, the description of the configuration and operation equivalent to the first embodiment may be omitted.

5.1 Configuration

First, a schematic configuration of data stored in the block BLK according to the fifth embodiment will be described with reference to FIG. 24. FIG. 24 shows an example in which the memory system 1 is configured such that six firmware are stored in three firmware blocks.

The blocks 1 to 3 are firmware blocks. In the firmware block according to the fifth embodiment, two slots and one header area are provided in one block. In FIG. 24, slots 1 and 2 for storing firmware 1 and 2, respectively, and header area 1 are provided in the block 1. Similarly, slots 3 and 4 for storing firmware 3 and 4, respectively, and header area 2 are provided in the block 2. In addition, slots 5 and 6 for storing firmware 5 and 6, respectively, and header area 3 are provided in the block 3.

The blocks 4 to n (where n is a natural number of 5 or more) are blocks for user data.

Next, an internal configuration of the firmware block according to the fifth embodiment will be described with reference to FIG. 25. As shown in FIG. 25, the header information includes, for example, the number of slots in the block (hereinafter, referred to as the slot count), start-up read FW information, slot allocation information, and erase count information. The start-up read FW information indicates which firmware is read from the firmware block during the startup of the memory system. The slot allocation information indicates a position of area set as each slot in the firmware block. The slot allocation information includes, for example, pairs of the slot address and the page address corresponding to the slot address. Alternatively, the slot allocation information includes pairs of the slot address, and the page address and the frame address corresponding to the slot address.

The number of slots provided in one firmware block is not limited to two, and may be three or more.

5.2 Firmware Update Process

Figure 26:
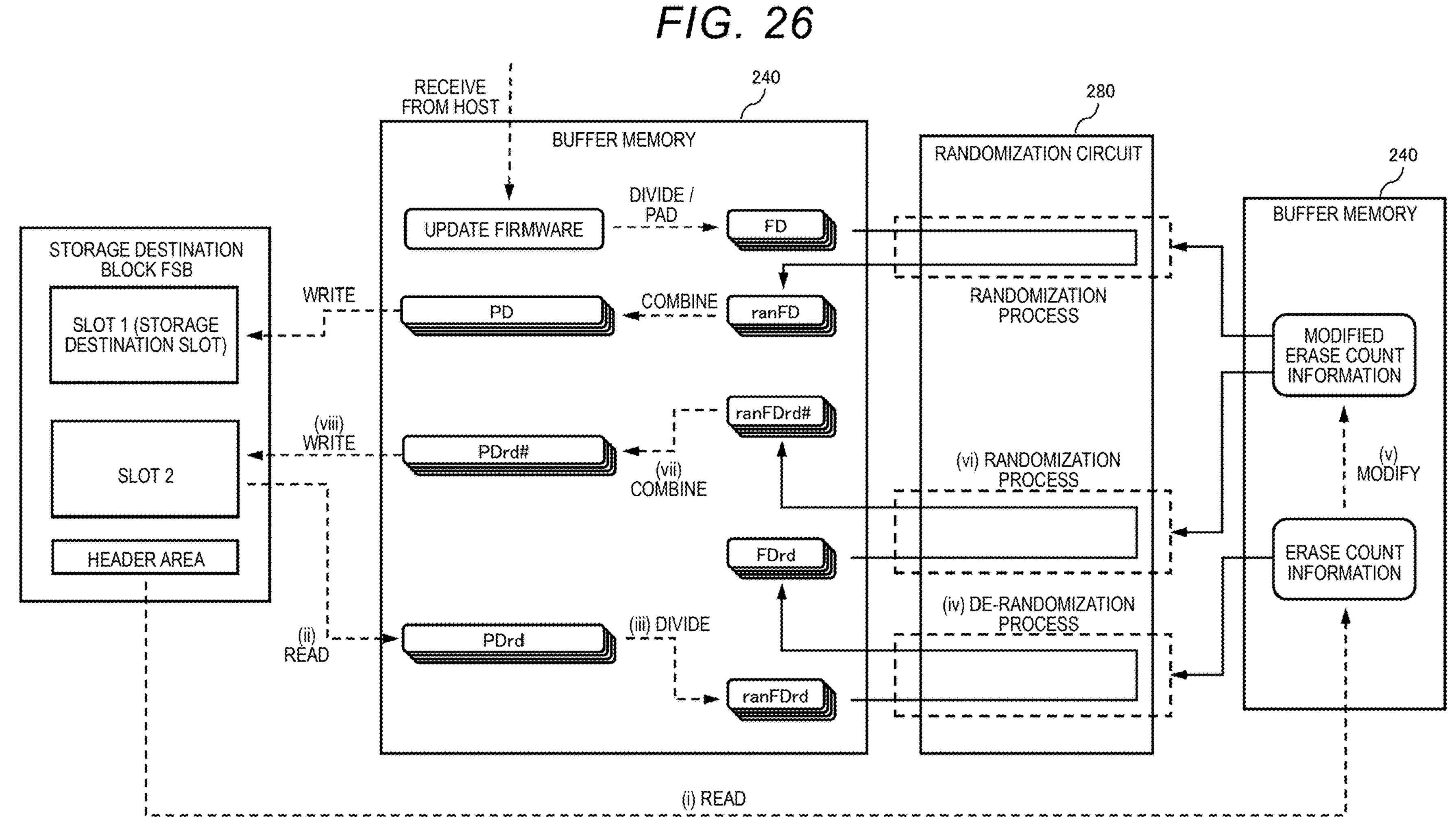
FIG. 26 shows an outline of a firmware update process according to the fifth embodiment.

Next, an outline of a firmware update process according to the fifth embodiment will be described. Since an example of data processing for the firmware update process by the memory controller 200 in the fifth embodiment is the same as the example of the first embodiment (for example, the example described with reference to FIG. 6), the description thereof will be omitted. FIG. 26 shows an outline of a firmware update process according to the fifth embodiment. FIG. 26 particularly shows an example in which one firmware block has two slots (slots 1 and 2). In FIG. 26, the solid line arrows indicate the flow of data, and the dashed line arrows and squares indicate the process by the memory controller 200. In addition, in FIG. 26, two buffer memories 240 are shown, but this is for convenience only and does not mean that two buffer memories 240 need to be provided. In addition, the description of the process described in the first embodiment may be omitted.

When the update process is initiated, the block control unit 262 reads the header information from the header area of the firmware block including the storage destination slot (storage destination block FSB) ((i) of FIG. 26). The read header information is decoded by the ECC circuit 270 and temporarily stored in, for example, the buffer memory 240. In FIG. 26, the slot count, start-up read FW information, and slot allocation information in the header information are omitted.

The block control unit 262 reads the page data PD from a slot other than the storage destination slot (hereinafter, referred to as a non-update slot) in the storage destination block FSB ((ii) of FIG. 26). In the following, during the firmware update process, the data read from the non-update slot and the data derived from that data may be suffixed with "rd". In FIG. 26, the page data PDrd is read from the slot 2, which is a slot other than the storage destination slot (slot 1). The read page data PD is temporarily stored in, for example, the buffer memory 240. When there are a plurality of non-update slots in the storage destination block FSB, the above process is performed for all the non-update slots (the same applies hereinafter).

The data management unit 266 divides the read page data PDrd and generates randomized frame data ranFDrd ((iii) of FIG. 26). The randomized frame data ranFDrd is decoded by the ECC circuit 270.

The randomization circuit 280 subsequently performs the de-randomization process on the randomized frame data ranFDrd to generate frame data FDrd ((iv) of FIG. 26).

During the de-randomization process of the randomized frame data ranFDrd, the seed value setting unit 264 refers to the header information and supplies the erase count information to the randomization circuit 280 (particularly, the random number generation circuit 282) as a seed value. That is, the de-randomization process of the randomized frame data ranFDrd is performed using the erase count information before being modified. In addition, the seed value setting unit 264 supplies the page address and the frame address associated with each randomized frame data ranFDrd to the randomization circuit 280 as seed values.

The block control unit 262 performs an erase operation on the storage destination block FSB.

The data management unit 266 modifies the read header information. The data management unit 266 particularly modifies the erase count information in the header information ((v) of FIG. 26).

The randomization circuit 280 subsequently performs the randomization process on the frame data FDrd to generate randomized frame data ranFDrd #((vi) of FIG. 26).

During the frame data FDrd randomization process, the seed value setting unit 264 refers to the modified header information and supplies the erase count information to the random number generation circuit 282 as a seed value. That is, the frame data FDrd randomization process is performed using the erase count information after being modified. In addition, the seed value setting unit 264 supplies the page address and the frame address associated with each frame data FDrd to the random number generation circuit 282 as seed values. The randomized frame data ranFDrd # is encoded by the ECC circuit 270.

The data management unit 266 combines the generated randomized frame data ranFDrd # to generate page data PDrd #((vii) of FIG. 26).

The block control unit 262 writes the page data PDrd # to the corresponding page in the storage destination block ((viii) of FIG. 26). In FIG. 26, the page data PDrd # is written to the corresponding page in the slot 2.

In addition, the block control unit 262 writes the modified header information to the header area of the storage destination block.

The update firmware UFW is processed by the memory controller 200, either before or after the above operations, or in parallel with the above operations, and is written to the storage destination slot. Since the processes performed on the update firmware is the same as the process in the first embodiment, the description thereof will be omitted.

The above is an outline of the firmware update process according to the fifth embodiment. As described above, in the firmware update process according to the fifth embodiment, the memory controller 200 reads firmware (page data PD) stored in the non-update slot. Further, the memory controller 200 performs the de-randomization process on the read firmware using the erase count information before being modified, and restores the original firmware. The restored firmware is randomized using the erase count information after being modified, and is written to the original slot. That is, even in the randomization process of the firmware stored in the non-update slot, a different seed value is used each time a firmware update process (or each time an erase operation of the storage destination block) is performed.

Figure 27:
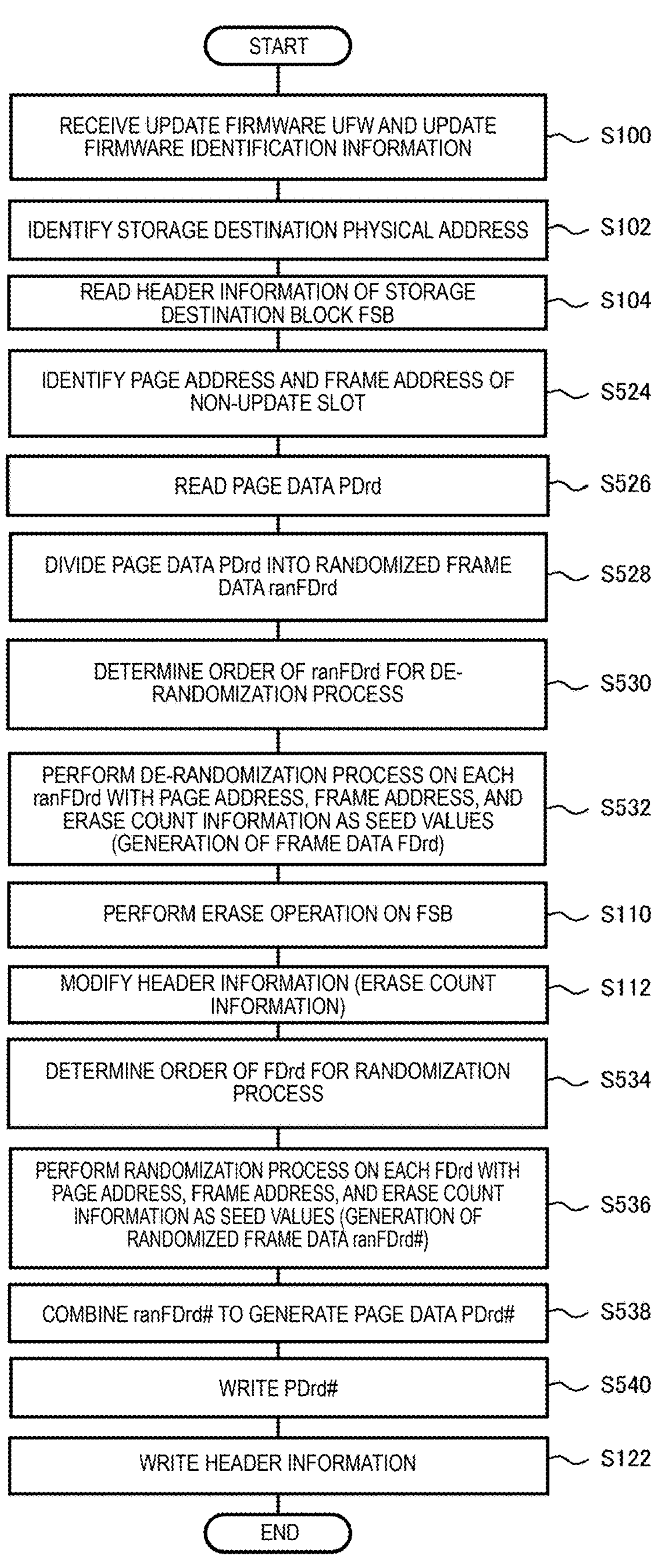
FIG. 27 shows a flow of the firmware update process according to the fifth embodiment.

Next, a flow of the firmware update process according to the fifth embodiment will be described with reference to FIG. 27. FIG. 27 particularly shows a flow when the process as described with reference to FIGS. 6 and 26 is performed.

In FIG. 27, the process steps for the update firmware (steps S106, S108, S114, S116, S118, and S120 in the first embodiment (FIG. 8)) are not shown. These steps may be performed before, after, or in parallel with the flow described below. Since the processes equivalent to the processes described in the first embodiment are performed for these steps, the description thereof will be omitted. In addition, for the steps having the same step numbers as the steps in the first embodiment (FIG. 8) in FIG. 27, equivalent processes to the processes described in the first embodiment are performed. The descriptions of these steps may be omitted. In the following, the process for the firmware stored in the non-update slot will be mainly described.

In step S524, the memory controller 200 identifies the page address of the non-update slot in the storage destination block FSB (hereinafter, referred to as a non-update page address) and the frame address of the non-update slot in the storage destination block FSB by referring to the storage destination slot address in the update firmware identification information and the slot allocation information in the header information read from the storage destination block FSB.

In step S526, the memory controller 200 reads the page data PDrd from the area corresponding to the non-update page address in the NAND flash memory 100. The read page data PDrd is temporarily stored in, for example, the buffer memory 240.

In step S528, the memory controller 200 divides the page data PDrd read in step S526 and generates randomized frame data ranFDrd. Each randomized frame data ranFDrd is associated with the page address corresponding to the original page data PDrd and the frame address indicating a position in the original page data PDrd. Each randomized frame data ranFDrd is decoded by the ECC circuit 270.

In step S530, the memory controller 200 determines the order of the randomized frame data ranFDrd in which the de-randomization process is performed. The de-randomization process may be performed in parallel on a plurality of randomized frame data ranFDrd.

In step S532, the memory controller 200 performs the de-randomization process on the randomized frame data ranFDrd in the order determined in step S530 to generate frame data FDrd. The memory controller 200 uses the erase count information in the header information, along with the page address and the frame address associated with the randomized frame data ranFDrd, as seed values. The memory controller 200 may generate seed values by performing arithmetic operations and/or other processes on the erase count information, the page address, and/or the frame address, and may use the generated seed values for the de-randomization process.

In step S110, the memory controller 200 performs an erase operation on the storage destination block FSB.

In step S112, the memory controller 200 modifies the header information (particularly, the erase count information) stored in the buffer memory 240.

In step S534, the memory controller 200 determines the order of the frame data FDrd in which the randomization process is performed. The randomization process may be performed in parallel on a plurality of frame data FDrd. The memory controller 200 may apply the processing order determined in step S530 to the randomization process for the frame data FDrd.

In step S536, the memory controller 200 performs the randomization process on the frame data FDrd in the order determined in step S534, to generate randomized frame data ranFDrd #. The memory controller 200 uses the modified erase count information, along with the page address and the frame address associated with the frame data FDrd, as seed values. The generated randomized frame data ranFDrd # is correlated with the page address and the frame address associated with the original frame data FDrd. The memory controller 200 may generate seed values by performing arithmetic operations and/or other processes on the erase count information, the page address, and/or the frame address, and may use the generated seed values for the randomization process. The randomized frame data ranFDrd # is encoded by the ECC circuit 270.

In step S538, the memory controller 200 combines the randomized frame data ranFDrd # associated with the same page address to generate page data PDrd #. The generation of the page data PDrd # is performed, for example, in ascending order of the page addresses in the storage destination slot.

In step S540, the memory controller 200 writes the page data PDrd # to the NAND flash memory 100. The page data PDrd # is written to the area of the storage destination block FSB indicated by the page address corresponding to each page data PDrd #.

When a plurality of update firmware are received from the host at once and the plurality of update firmware are stored in different storage destination slots in the same storage destination block FSB, the memory controller 200 does not need to perform a series of firmware update processes for each update firmware. Specifically, in the firmware update process involving a single erase operation of the storage destination block FSB, the memory controller 200 may, for example, perform data processing on the plurality of update firmware, and may write the update firmware to the storage destination slot corresponding to each update firmware. That is, the memory controller 200 does not need to perform an erase operation on the storage destination block FSB the number of times equal to the number of pieces of the update firmware stored in the storage destination block FSB. At this time, the memory controller 200 performs the firmware update process by considering the slots in the storage destination block FSB, other than the storage destination slots of the plurality of update firmware, as non-update slots.

5.3 Firmware Restoration Process

Since the firmware restoration process is equivalent to the process described in the first embodiment, a detailed description thereof will be omitted. In the identification process of the page address and the frame address of the read target slot (corresponding to step S152 in the first embodiment (FIG. 9)), the memory controller 200 refers to the start-up read FW information in addition to the slot allocation information of the header information.

In the randomization process and the de-randomization process of the firmware, the memory controller 200 uses common erase count information for the plurality of firmware stored in the storage destination block FSB as a seed value, but the present disclosure is not limited thereto. That is, for example, the memory controller 200 may store a plurality of pieces of erase count information corresponding to each slot as header information, and perform the randomization process and the de-randomization process using different erase count information for each slot. Alternatively, the memory controller 200 may generate the seed value by performing arithmetic operations and/or other processes different for each slot on the common erase count information, and use the generated seed value for the randomization process and the de-randomization process.

5.4 Effects

The memory system according to the fifth embodiment has the same effects as the effects of the first embodiment. In addition, the memory system according to the fifth embodiment has the following effects as described below.

When any one of the plurality of firmware stored in the firmware block is updated, the firmware that is not updated is rewritten with the same firmware as before the erase operation for the block. Therefore, when a fixed value is used as a seed value to perform the firmware randomization process, the same cell data is programmed into each memory cell corresponding to the slot in which the firmware that is not updated is stored before and after the erase operation.

In the fifth embodiment, the erase count information of the write destination block or the read target block is used as a seed value. Therefore, it is possible to change the seed value used for the randomization process performed on the firmware that is not updated before and after the erase operation. This makes it possible to prevent the same value from being repeatedly programmed into the same memory cell in slots other than the storage destination slot during the firmware update process, thereby preventing a decrease in the reliability of the NAND flash memory.

In addition, in the fifth embodiment, since firmware for a plurality of slots is stored in one block, it is possible to reduce the number of blocks that need to be provided as firmware blocks.

In the fifth embodiment, the example has been described in which the erase count information is used as a seed value in a memory system 1 in which the firmware block has a plurality of slots, but the present disclosure is not limited thereto. That is, in such a memory system 1, as described in the second to fourth embodiments, it is possible to use the total erase count information, the erase timing information, or the firmware information as a seed value. When the information related to the firmware is used as a seed value, for example, the total value of the information related to the plurality of firmware stored in the firmware block is used as the seed value.

6. Sixth Embodiment

Next, a memory system according to a sixth embodiment will be described. In the sixth embodiment, the header information is randomized and stored in the header area. In the following, the description of the configuration and operation equivalent to the first embodiment may be omitted.

6.1 Outline

The header information that is stored after being randomized is de-randomized when being read. However, the header information of the firmware block may be read first from the NAND flash memory 100 at the startup of the memory system 1. Therefore, the seed value used for the de-randomization process of the header information needs to be data stored in an area other than the NAND flash memory 100. In the sixth embodiment, an example will be described in which a randomization key provided in the IPL (hereinafter, referred to as a ROM key) is used as a seed value for the randomization process and the de-randomization process performed on header information.

6.2 Header Information Write Operation

First, a header information write operation according to the sixth embodiment will be described. In the sixth embodiment, the memory controller 200 performs the randomization process on the header information when writing the header information to the NAND flash memory 100. At this time, the memory controller 200 performs the randomization process using the ROM key as a seed value. An example of data processing performed on the header information is the same as the data processing performed on the update firmware in the first embodiment (for example, the data processing described with reference to FIG. 6).

An outline of the header information write operation according to the sixth embodiment will be described with reference to FIG. 28. In the following, an example will be described in which the header area is set in one page in the firmware block. In the following, the data derived from the header information may be suffixed with "h".

When the write operation of the header information is initiated, the data management unit 266 divides and/or pads the header information to generate frame data FDh ((i) of FIG. 28).

The randomization circuit 280 subsequently performs the randomization process on the generated frame data FDh to generate randomized frame data ranFDh ((ii) of FIG. 28). During the randomization process of the frame data FDh, the seed value setting unit 264 refers to the IPL and supplies the ROM key to the randomization circuit 280 as a seed value. The randomized frame data ranFDh is encoded by the ECC circuit 270.

The data management unit 266 combines the generated randomized frame data ranFDh to generate page data PDh ((iii) of FIG. 28).

The block control unit 262 writes the page data PDh to the header area ((iv) of FIG. 28).

The above is an outline of the header information write operation according to the sixth embodiment. As described above, in the write operation of the header information according to the sixth embodiment, the memory controller 200 performs the randomization process on the header information using the ROM key.

Figure 29:
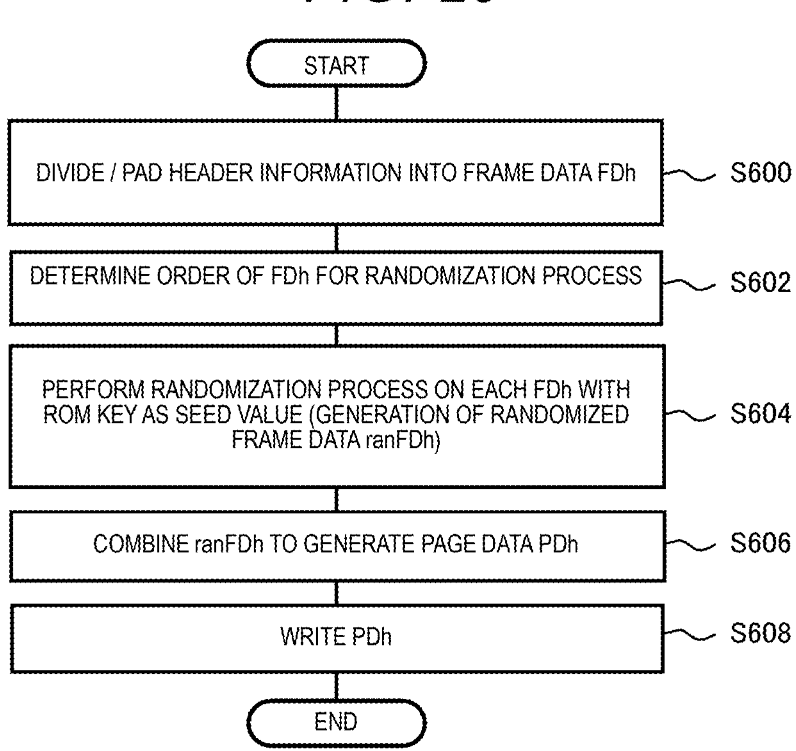
FIG. 29 shows a flow of the header information write operation according to the sixth embodiment.

Next, a flow of the header information write operation according to the sixth embodiment will be described with reference to FIG. 29. FIG. 29 particularly shows a flow when the process as described with reference to FIG. 28 is performed. The following flow is performed, for example, in firmware update process. Specifically, for example, the writing of the header information in the firmware update process according to the first embodiment (step S122 in FIG. 8) is replaced with the following write operation.

In step S600, the memory controller 200 divides and/or pads the header information to generate frame data FDh.

In step S602, the memory controller 200 determines the order of the frame data FDh in which the randomization process is performed. The randomization process may be performed in parallel on a plurality of frame data FDh.

In step S604, the memory controller 200 performs the randomization process on the frame data FDh in the order determined in step S602, to generate randomized frame data ranFDh. The memory controller 200 uses the ROM key in the IPL as a seed value. The memory controller 200 may generate a seed value by performing arithmetic operations and/or other processes on the ROM key, and may use the generated seed value for the randomization process. The randomized frame data ranFD is encoded by the ECC circuit 270.

In step S606, the memory controller 200 combines the randomized frame data ranFDh to generate page data PDh.

In step S608, the memory controller 200 writes the page data PDh to the NAND flash memory 100. The page data PD is written to the header area of the storage destination block FSB.

The header information write operation ends.

In step S606, the memory controller 200 acquires the ROM key by referring to the IPL and performs the randomization process, but the present disclosure is not limited thereto. That is, for example, the ROM key may be provided in the update program UDP, and the memory controller 200 may acquire the ROM key by referring to the update program UDP.

6.3 Header Information Read Operation

Figure 30:
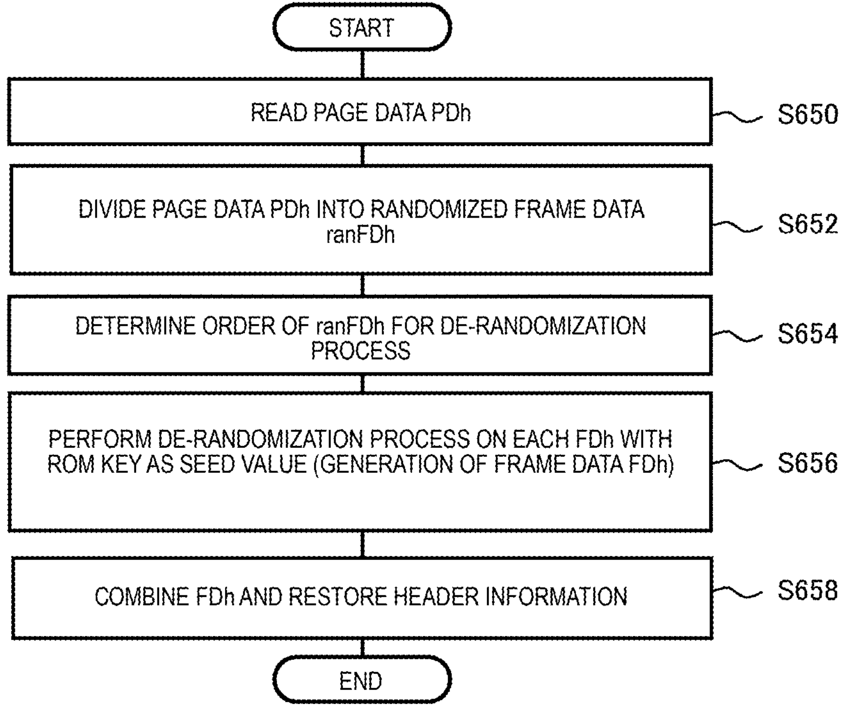
FIG. 30 shows a flow of a header information read operation according to the sixth embodiment.

Next, a header information read operation according to the sixth embodiment will be described with reference to FIG. 30. FIG. 30 shows a flow of a header information read operation according to the sixth embodiment. FIG. 30 particularly shows a flow of the process when the header information written to the NAND flash memory 100 by the process described with reference to FIGS. 28 and 29 is read. The following flow is performed, for example, in firmware restoration process. Specifically, for example, the reading of the header information in the firmware restoration process according to the first embodiment (step S150 in FIG. 9) is replaced with the following read operation flow.

In step S650, the memory controller 200 reads the page data PDh from the header area of the storage destination block. The address of the header area is identified by referring to the IPL.

In step S652, the memory controller 200 divides the page data PDh read in step S650 and generates randomized frame data ranFDh. Each randomized frame data ranFDh is decoded by the ECC circuit 270.

In step S654, the memory controller 200 determines the order of the randomized frame data ranFDh in which the de-randomization process is performed. The de-randomization process may be performed in parallel on a plurality of randomized frame data ranFDh.

In step S656, the memory controller 200 performs the de-randomization process on the randomized frame data ranFDh in the order determined in step S654, to generate frame data FDh. The memory controller 200 uses the ROM key in the IPL as a seed value. The memory controller 200 may generate a seed value by performing arithmetic operations and/or other processes on the ROM key, and may use the generated seed value for the de-randomization process.

In step S658, the memory controller 200 combines the frame data FDh restored in step S656 to generate header information.

The header information read operation ends.

6.4 Effects

The memory system according to the sixth embodiment has the following effects as described below.

In the sixth embodiment, before the header information is written to the NAND flash memory 100, the header information is subjected to the randomization process. As a result, it is possible to prevent concentration of data patterns in the data written to the header area.

The write operation and the read operation of the header information described in the sixth embodiment can be applied to any of the configurations described in the first embodiment to the fifth embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, comprising:

a first non-volatile memory including a plurality of blocks, each of the plurality of blocks being a unit for a data erase operation;

a controller electrically connected to the first non-volatile memory and configured to:

receive first data from the host;

randomize the first data using a first randomization key to generate third data;

randomize fourth data using the first randomization key to generate fifth data;

write the first randomization key to the first non-volatile memory;

write the third data and the fifth data to a first block among the plurality of blocks; and in response to receiving, from the host, a request for updating data stored in the first block, receive sixth data from the host;

randomize the sixth data using a second randomization key to generate eighth data, the second randomization key being different from the first randomization key;

derandomize the fifth data using the first randomization key to obtain the fourth data;

randomize the obtained fourth data using the second randomization key to generate ninth data;

write the second randomization key to the first non-volatile memory; and write the eighth data and the ninth data to the first block.

2. The memory system according to claim 1, wherein the first randomization key is based on a count of the data erase operation executed on the first block.

3. The memory system according to claim 2, wherein the first randomization key is also based on a count of the data erase operation executed on a second block among the plurality of blocks.

4. The memory system according to claim 1, wherein the first randomization key is based on a timing of the data erase operation executed on the first block.

5. The memory system according to claim 1, wherein the first randomization key is based on information about the first data.

6. The memory system according to claim 5, wherein the information is at least part of identification information of the first data.

7. The memory system according to claim 5, wherein the information is at least part of version information of the first data.

8. The memory system according to claim 1, wherein the first randomization key is based on a count or timing of a write operation of the first data to the first block.

9. The memory system according to claim 1, wherein the first data is first firmware, and the request is a request for firmware update, and the first randomization key is included in information used for an update process or a restoration process of the first firmware.

10. The memory system according to claim 1, wherein the controller is further configured to write the second data-first randomization key to the first block.

11. The memory system according to claim 10, wherein the controller is further configured to:

write the third data to a first area in the first block; and write the first randomization key to a second area in the first block, the second area being different from the first area.

12. The memory system according to claim 11, wherein the controller is further configured to:

write the second randomization key to the second area;

write the eighth data to the first area; and write the ninth data to a third area in the first block, the third area being different from the first area.

13. The memory system according to claim 1, wherein the controller is further configured to:

read the written first randomization key and the third data from the first non-volatile memory; and derandomize the third data using the first randomization key to obtain the first data.

14. The memory system according to claim 1, wherein the controller is further configured to, in response to receiving the request, read the written first randomization key and the fifth data from the first block.

15. The memory system according to claim 1, further comprising:

a second non-volatile memory where a first key is stored, wherein the controller is electrically connected to the second non-volatile memory and further configured to:

randomize the first randomization key using the first key to generate tenth data; and write the tenth data to the first non-volatile memory.

16. The memory system according to claim 15, wherein the controller is further configured to:

read the first key from the second non-volatile memory;

read the third data from the first block;

read the tenth data from the first non-volatile memory;

derandomize the tenth data using the first key to obtain the first randomization key; and derandomize the third data using the first randomization key to obtain the first data.

17. The memory system according to claim 1, wherein each of the plurality of blocks includes a memory cell;

the plurality of blocks further includes a third block different from the first block;

the controller is further configured to:

write data of a first number of bits to the memory cell in the first block; and write data of a second number of bits to the memory cell in the third block, the second number being larger than the first number.

18. The memory system according to claim 1, wherein the controller is further configured to:

in response to receiving a command for writing the first data from the host, execute the data erase operation to the first block; and after the data erase operation, write the third data to the first block.

19. The memory system according to claim 1, wherein the controller is configured to randomize data using a variable randomization key that has a different value each time the data erase operation is executed on the first block, the variable randomization key including the first randomization key used to randomize the first data and the fourth data, and the second randomization key used to randomize the sixth data.

20. A memory system connectable to a host, comprising:

a first non-volatile memory including a plurality of blocks, each of the plurality of blocks being a unit for a data erase operation, and the plurality of blocks including a first block;

a controller electrically connected to the first non-volatile memory and configured to:

receive first data from the host;

randomize the first data using a first randomization key to generate third data;

write the first randomization key to the first non-volatile memory;

write the third data to the first block; and in response to receiving, from the host, a request for updating data stored in the first block, derandomize the third data using the first randomization key to obtain the first data;

randomize the first data using a second randomization key to generate fifth data, the second randomization key being different from the first randomization key;

write the fifth data to the first block; and write the second randomization key to the first non-volatile memory.

* * * * *